United States Patent
Hanabusa

(10) Patent No.: US 11,043,845 B2
(45) Date of Patent: Jun. 22, 2021

(54) POWER FEEDING DEVICE AND WIRELESS POWER TRANSMISSION DEVICE

(71) Applicant: TDK CORPORATION, Tokyo (JP)

(72) Inventor: Kazuyoshi Hanabusa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1055 days.

(21) Appl. No.: 15/463,160

(22) Filed: Mar. 20, 2017

(65) Prior Publication Data
US 2017/0279311 A1    Sep. 28, 2017

(30) Foreign Application Priority Data
Mar. 22, 2016    (JP) .............................. JP2016-057200

(51) Int. Cl.
| | | |
|---|---|---|
| H02J 50/12 | (2016.01) | |
| H02J 7/00 | (2006.01) | |
| H02J 50/70 | (2016.01) | |
| H02J 50/90 | (2016.01) | |
| H02J 7/02 | (2016.01) | |

(52) U.S. Cl.
CPC ............ *H02J 50/12* (2016.02); *H02J 7/0042* (2013.01); *H02J 7/025* (2013.01); *H02J 50/70* (2016.02); *H02J 50/90* (2016.02)

(58) Field of Classification Search
CPC .. H02J 50/12; H02J 50/90; H02J 7/025; H02J 50/70; H02J 7/0042
USPC .......................................................... 307/104
See application file for complete search history.

(56) References Cited

U.S. PATENT DOCUMENTS

| | | | | |
|---|---|---|---|---|
| 9,431,989 B2* | 8/2016 | Deguchi | ................. | H02J 50/10 |
| 2011/0196544 A1* | 8/2011 | Baarman | ................. | H02J 50/12 |
| | | | | 700/291 |
| 2012/0146580 A1* | 6/2012 | Kitamura | ................ | H02J 50/80 |
| | | | | 320/108 |
| 2012/0262002 A1* | 10/2012 | Widmer | ................ | B60L 3/0023 |
| | | | | 307/104 |
| 2014/0008995 A1 | 1/2014 | Kanno | | |
| 2014/0028253 A1* | 1/2014 | Toya | ....................... | H02J 50/80 |
| | | | | 320/108 |
| 2014/0175896 A1* | 6/2014 | Suzuki | .................... | H02J 50/80 |
| | | | | 307/104 |
| 2015/0380157 A1 | 12/2015 | Green et al. | | |

FOREIGN PATENT DOCUMENTS

| | | |
|---|---|---|
| CN | 104471832 A | 3/2015 |
| CN | 104969315 A | 10/2015 |
| JP | 2014064460 A | 4/2014 |

\* cited by examiner

*Primary Examiner* — Alfonso Perez Borroto
(74) *Attorney, Agent, or Firm* — Oliff PLC

(57) ABSTRACT

A power feeding device which wirelessly transmits power towards a power receiving device equipped with a power receiving coil device, comprising: a magnetic structure having two magnetic bodies; and a power feeding coil device which receives power from a power supply and generates an alternating magnetic field, the mutual main surfaces of the two magnetic bodies face each other, and the two magnetic bodies are disposed to be separated at a predetermined distance, the power feeding coil device is disposed at any position between the two magnetic bodies, the two magnetic bodies receive the alternating magnetic field during power transmission, and a power feeding region in which transmitting power towards the power receiving coil device is possible is formed between the two magnetic bodies.

15 Claims, 16 Drawing Sheets

POWER FEEDING DEVICE AND WIRELESS POWER TRANSMISSION DEVICE

FIELD OF THE INVENTION

The present invention relates to a power feeding device and a wireless power transmission device which are capable of wirelessly transmitting power.

BACKGROUND

The wireless power transmission technology that supplies power without using a power supply cord attracts lots of attention. The wireless power transmission technology can wirelessly supply power from a power feeding side to a power receiving side, so it is expected to be applied in various products such as transporting machines such as electric train and electric vehicle, household appliances, electronic devices, wireless communication devices, and toys.

In view of the circumstance shown above, a power feeding device that wirelessly transmits power to a power receiving device has been being actively developed. In the power feeding device, in order to improve the convenience for a user, it is required to broaden the range where the power receiving device can receive power, and the requirement has been being enhanced for developing a power feeding device which can transmit power to the power receiving device wherever it is placed in the power feeding device.

For example, Patent Document 1 has suggested a charging stand which charges an apparatus with a built-in battery which incorporates a battery and an induction coil. Specifically, the charging stand comprises: a power supply coil for inducing an electromotive force in the induction coil; a moving mechanism for moving the power supply coil; and a position detection controller that detects the position of the induction coil and controls the moving mechanism so as to make the power supply coil get close to the induction coil. When the apparatus with a built-in battery is placed on an upper plate of a case in the charging stand, the position of the apparatus with a built-in battery is detected by the position detection controller, the position detection controller which detected the position of the apparatus with a built-in battery controls the moving mechanism to make the power supply coil move along the upper plate by the moving mechanism, and then the power supply coil gets close to the induction coil of the apparatus with a built-in battery. Thus, the charging stand is realized which can charge the built-in battery wherever the apparatus with a built-in battery is placed on the upper surface of the case.

PATENT DOCUMENT

Patent Document 1: JP-A-2014-64460

SUMMARY

However, in the technology described in Patent Document 1, since an actuator such as servomotor or the like is needed as the moving mechanism for moving the power supply coil, the problem arises that power is consumed in the use except the original use of wireless power transmission. In addition, in the technology described in Patent Document 1, after the position of the apparatus with a built-in battery is detected by the position detection controller, the moving mechanism is controlled to move so as to make the power supply coil get close to the induction coil. Therefore, the time for positioning the power supply coil and the induction coil is needed from placing the apparatus with a built-in battery on the charging stand to starting to charge the built-in battery. Therefore, the problem also arises that response speed until the charging starts is low. Furthermore, although the apparatus with a built-in battery is charged on any position of the charging stand in the technology described in Patent Document 1, the apparatus with a built-in battery is not supposed to charge while it is moving, and thus if the apparatus with a built-in battery placed on the charging stand moves, it is afraid that the movement of the power supply coil cannot follow the movement of the apparatus with a built-in battery, which would cause a charging failure.

The present invention is provided in view of the related problems. It aims to provide a power feeding device and a wireless power transmission device. In the power feeding device and the wireless power transmission device, unnecessary electricity consumption can be suppressed, the response until power starts transmitting to the power receiving device is high, the arrangement range is broadened in which power can be transmitted to the power receiving device, and even in the case that the position of the power receiving device always changes, power also can be transmitted.

The power feeding device according to an embodiment of the present invention wirelessly transmits power to the power receiving device equipped with a power receiving coil device; the power feeding device comprises a magnetic structure having two magnetic bodies, and a power feeding coil device which receives power from a power supply and generates an alternating magnetic field; the mutual main surfaces of the two magnetic bodies face each other, and the two magnetic bodies are disposed to be separated at a predetermined distance; the power feeding coil device is disposed at any position between the two magnetic bodies; the two magnetic bodies receive the alternating magnetic field during power transmission, a power feeding region in which transmitting power towards the power receiving device is possible is formed between the two magnetic bodies.

According to the embodiment of the present invention, a magnetic flux generated from the power feeding coil device disposed between the two magnetic bodies of the magnetic structure goes around in such a manner that the magnetic flux flows into one magnetic body of the magnetic structure, is radiated from the whole surface of one magnetic body to the air, and then flows into the other magnetic body of the magnetic structure. At that time, the power feeding region is formed between the two magnetic bodies of the magnetic structure. Moreover, if the power receiving coil device is disposed between the two magnetic bodies, the magnetic flux radiated from the magnetic body interlinks with the power receiving coil device, and an induced electromotive force generates in the power receiving coil device. Thus, power transmission towards the power receiving coil device is started at once without moving the power feeding coil by the actuator, by placing the power receiving coil device between the two magnetic bodies. As a result, unnecessary electricity consumption can be suppressed, and the response until power starts transmitting to the power receiving device is high. Besides, the magnetic flux, which is generated from the power feeding coil device and flows into one magnetic body of the magnetic structure, is radiated from the whole surface of this magnetic body to the air, and thus the power feeding region is formed at all regions between the two magnetic bodies. Thus, even the power receiving coil device moves between the two magnetic bodies, power also can be transmitted. Therefore, the arrangement range is broadened in which power can be transmitted to the power receiving device, and even in the case that the position of the power receiving device always changes, power also can be transmitted.

Preferably, the two magnetic bodies can comprise a plurality of magnetic plates, respectively. The magnetic body usually trends to deform easily during production if the shape of the magnetic body becomes large, and thus yield reduces and it becomes expensive. On the contrary, the decrease of the yield can be suppressed and low cost can be realized by composing the magnetic body with a plurality of magnetic plates.

Preferably, an electromagnetic shielding material can be comprised on at least either of the surface sides opposite to the side where the mutual main surfaces of the two magnetic bodies face each other. In that case, noise leaked towards the outside can be reduced by disposing the electromagnetic shielding material.

The power feeding coil device is preferably disposed in such a manner that the power feeding coil device contacts with at least either of the two magnetic bodies through an insulating material. The inductance value changes due to the distance between the power feeding coil device and the two magnetic bodies. Thus, when the power feeding coil device is disposed in contact with one of the two magnetic bodies, the deviation of the distance between the power feeding coil device and the magnetic bodies is reduced, and the deviation of the inductance value caused by the arrangement of the power feeding coil device can be decreased. If the deviation of the inductance value is suppressed to be low, the deviation of the generated magnetic flux can also been suppressed to be low. Thus, stable power feeding can be conducted.

The power feeding coil device is preferably configured in such a manner that the power feeding coil device can move between the two magnetic bodies. In the power feeding region far away from the power feeding coil device, the amount of the magnetic flux released from the surface of the magnetic body decreases. Thus, electric energy capable of receiving power reduces in the power feeding region far away from the power feeding coil device. On the contrary, when the power feeding coil device is configured in such a manner that the power feeding coil device can move, the power feeding region also will change upon the movement of the power feeding coil device. That is, the power feeding region that is capable of supplying power with a certain fixed amount or more can be formed at any position between the two magnetic bodies.

The two magnetic bodies is preferably disposed in such a manner that the distance between the two magnetic bodies becomes short as leaving from the position where the power feeding coil device is disposed. In the power feeding region at a position away from the power feeding coil device, the amount of the magnetic flux released from the surface of the magnetic body decreases. On the other hand, if the distance between the two magnetic bodies is shorted down, the amount of the magnetic flux released from the surface of the magnetic body of the shorted part increases. Therefore, when the two magnetic bodies is disposed in such a manner that the distance between the two magnetic bodies becomes short as leaving from the position where the power feeding coil device is disposed, the decrease amount of the magnetic flux released from the surface of the magnetic bodies of the power feeding region at the position away from the power feeding coil device can be reduced. As a result, the deviation of the amount of the magnetic flux released from the surface of the magnetic bodies can be suppressed (the deviation is caused by the position in the power feeding region), and a certain fixed amount or more power can be stably supplied even in the case that the position of the power receiving device always changes.

The two magnetic bodies are preferably disposed in such a manner that the distance between the two magnetic bodies becomes long towards the destination to which the power feeding coil device moves. If the destination region to which the power feeding coil device approaches as the power feeding coil device moves compared to the case before the power feeding coil device moves, the amount of the magnetic flux released from the surface of the magnetic bodies between the two magnetic bodies increases. Thus, when the power feeding coil device approaches in the destination region to which the power feeding coil device moves, the transmission amount of power increases and then too much power is transmitted. On the other hand, if the distance between the two magnetic bodies is broadened, the amount of the magnetic flux released from the surface of the magnetic bodies of the broadened part reduces. Therefore, when the two magnetic bodies is disposed in such a manner that the distance between the two magnetic bodies becomes long towards the destination to which the power feeding coil device moves, the increase amount of the amount of the magnetic flux released from the surface of the magnetic bodies at the destination region to which the power feeding coil device moves can be decreased. As a result, in the destination region to which the power feeding coil device moves, the deviation of the amount of the magnetic flux released from the surface of the magnetic body between the two magnetic bodies before and after the power feeding coil device moves can be suppressed, and a stable power can be supplied without supplying an excessive power.

The power feeding coil device preferably comprises a plurality of coil devices which do not overlap with each other when viewing from an opposite direction of the two magnetic bodies. In the power feeding region away from the position where the power feeding coil device is disposed, the amount of the magnetic flux released from the surface of the magnetic body reduces. Thus, when a plurality of power feeding coil devices are disposed at the position where they do not overlap with each other when viewing from a direction in which the magnetic bodies face each other, the range of the power feeding region can be broadened in which the magnetic flux with a certain fixed amount or more is released from the surface of the magnetic body.

A power supply device supplying power to the power feeding coil device is preferably further comprised. The power supply device can select the coil device for supplying power among the plurality of coil devices according to the region to be power feeded.

The wasteful electricity consumption can be cut down by selecting the power feeding coil device for supplying power among the plurality of coil devices according to the region to be power feeded.

The power feeding coil device preferably comprises a power feeding coil which is constructed by helically winding a conducting wire on an magnetic core. When a coil with the same inductance value is produced, if the magnetic core is comprised, winding number of the coil can be reduced. Thus, the resistance value of the coil also can be decreased, and the power loss caused by the resistance can be decreased.

At least one relay coil device is preferably comprised. The relay coil device is magnetically coupled with the power feeding coil device through the two magnetic bodies and is disposed at any position between the two magnetic bodies.

In the power feeding region leaving from the power feeding coil device, the amount of the magnetic flux released from the surface of the magnetic body decreases. If the relay coil device is disposed, the magnetic flux released from the surface of the magnetic body interlinks with the relay coil device to make the magnetic flux change, which causes to generate a voltage in the coil of the relay coil device. A current flows to the relay coil device through the generated voltage, and thus a magnetic flux generates from the relay coil device. Therefore, when the relay coil device is disposed, the decrease amount of the amount of the magnetic flux released from the surface of the magnetic body can be reduced even in the power feeding region leaving from the power feeding coil device.

The relay coil device preferably comprises a relay coil which is constructed by helically winding a conducting wire on an magnetic core. When a coil with the same inductance value is produced, if the magnetic core is comprised, winding number of the coil can be reduced. Thus, the resistance value of the coil also can be decreased, and the power loss caused by the resistance can be decreased.

Preferably, the power feeding coil device comprises two coil devices which overlap with each other when viewing from the opposite direction of two magnetic bodies. One of the two coil devices is disposed to contact with the one of the two magnetic bodies through an insulating material. The other of the two coil device is disposed to contact with the other of the two magnetic body through an insulating material. In this case, the deviation of the inductance value caused by the disposition of the power feeding coil device can be reduced. If the deviation of the inductance value can be suppressed to be low, the deviation of the generated magnetic flux also can be suppressed to be low. Thus, a stable power can be supplied.

A power supply device which supplies power to the power feeding coil device is preferably further comprised. The power supply device can control a phase shift amount between a phase of an alternating voltage applied on one of the two coil devices and a phase of an alternating voltage applied on the other of the two coil device. In this case, the electric energy received in the power feeding region can be controlled according to the phase shift amount.

The wireless power transmission device according to another embodiment of the present invention comprises the above mentioned power feeding device and a power receiving device equipped with a power receiving coil device. According to the embodiment of the present invention, a wireless power transmission device can be provided in which unnecessary electricity consumption can be suppressed, the response until power starts transmitting to the power receiving device is high, the arrangement range is broadened in which power can be transmitted to the power receiving device, and even in the case that the position of the power receiving device always changes, power also can be transmitted.

According to some embodiments of the present invention, a power feeding device and a wireless power transmission device can be provided in which unnecessary electricity consumption can be suppressed, the response until power starts transmitting to the power receiving device is high, the arrangement range is broadened in which power can be transmitted to the power receiving device, and even in the case that the position of the power receiving device always changes, power also can be transmitted.

DETAILED DESCRIPTION OF EMBODIMENTS

The embodiments used to carry out the present invention are described in detail with reference to the drawings. However, the present invention is not limited to the following embodiments. In addition, the constituent element described below can be properly combined. Moreover, the same symbol is designated for the same element or the element having the same function in the following description, repeated illustration of which is omitted.

The First Embodiment

Figure 1:
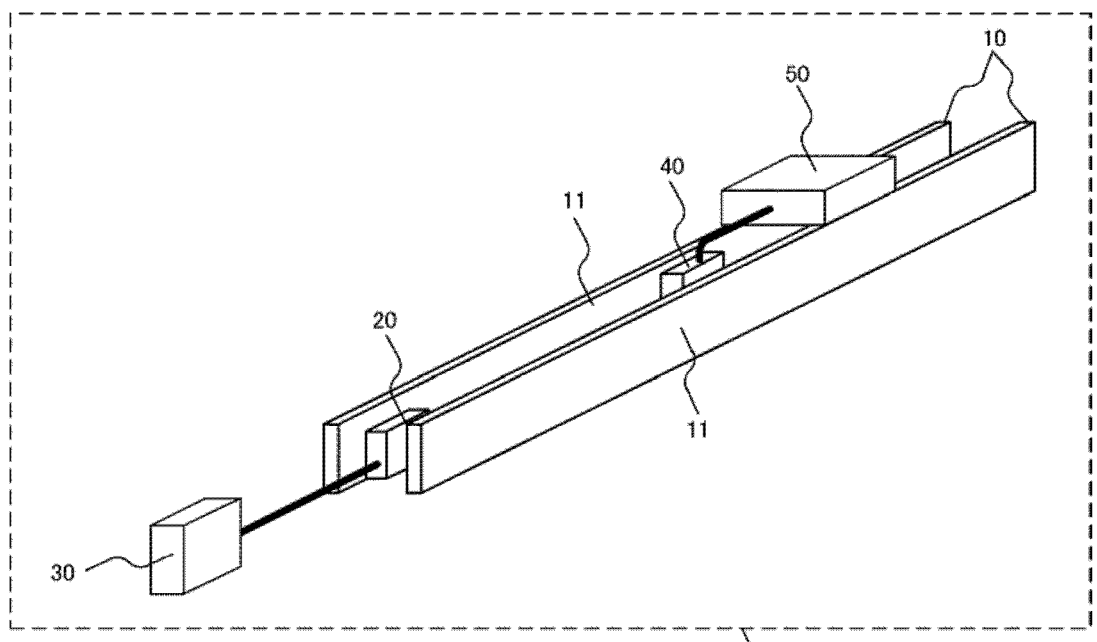
FIG. 1 is a schematic perspective view illustrating a wireless power transmission device of the first embodiment of the present invention.
Figure 2:
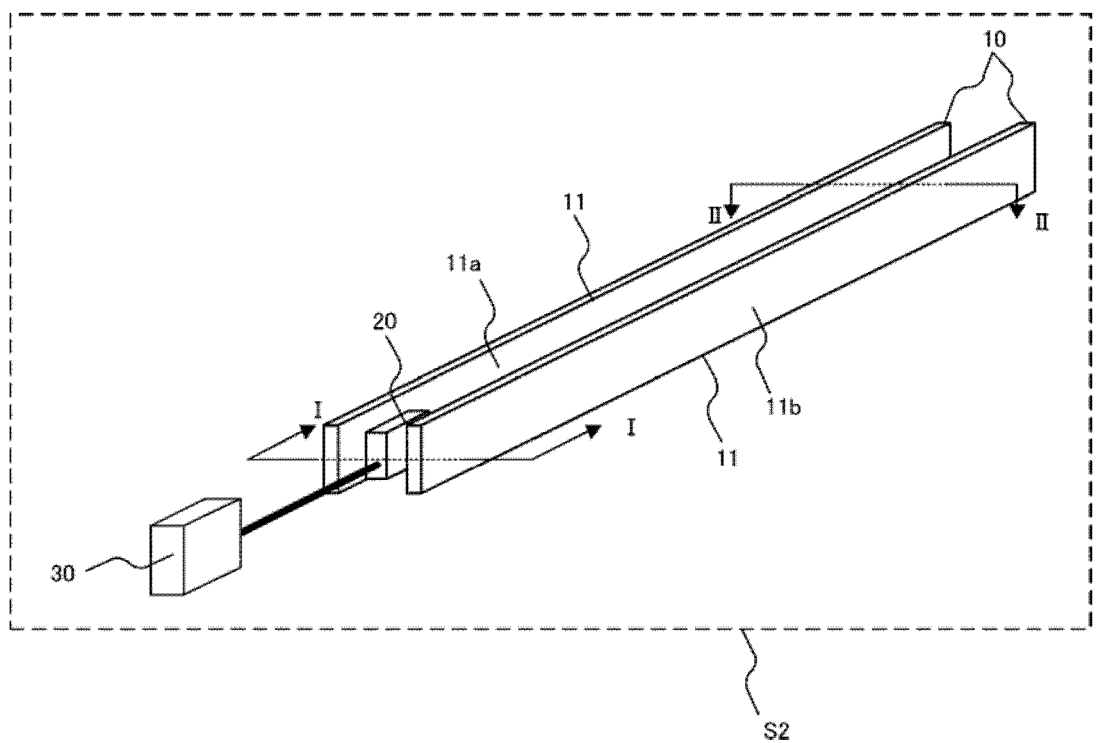
FIG. 2 is a schematic perspective view illustrating a power feeding device of the wireless power transmission device of the first embodiment of the present invention.
Figure 3:
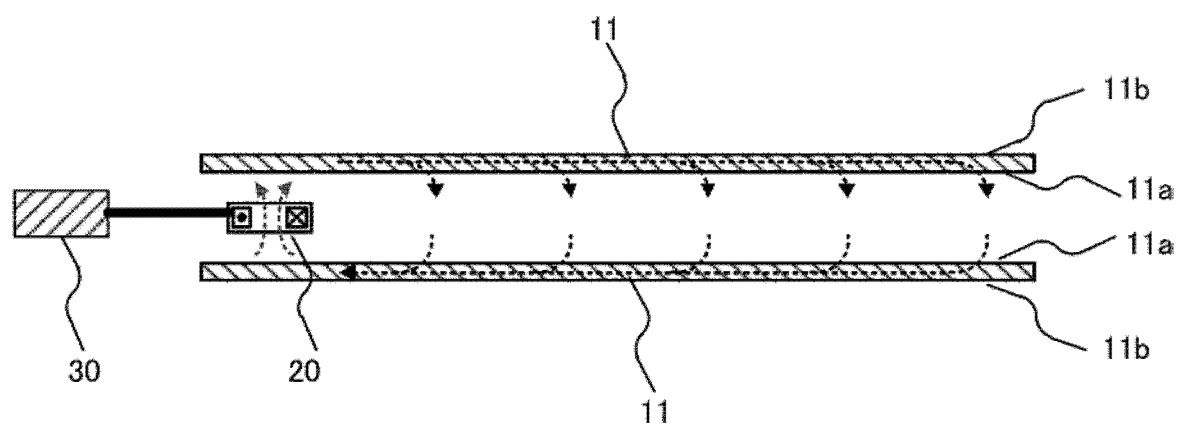
FIG. 3 is a cross-sectional view of the power feeding device along the cutting line I-I of FIG. 2.
Figure 4:
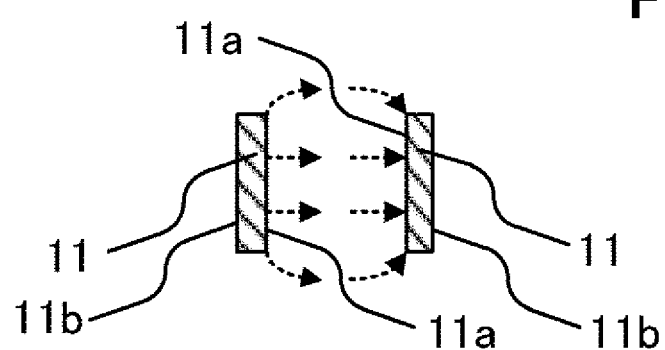
FIG. 4 is a cross-sectional view of the magnetic structure along the cutting line II-II of FIG. 2.
Figure 5:
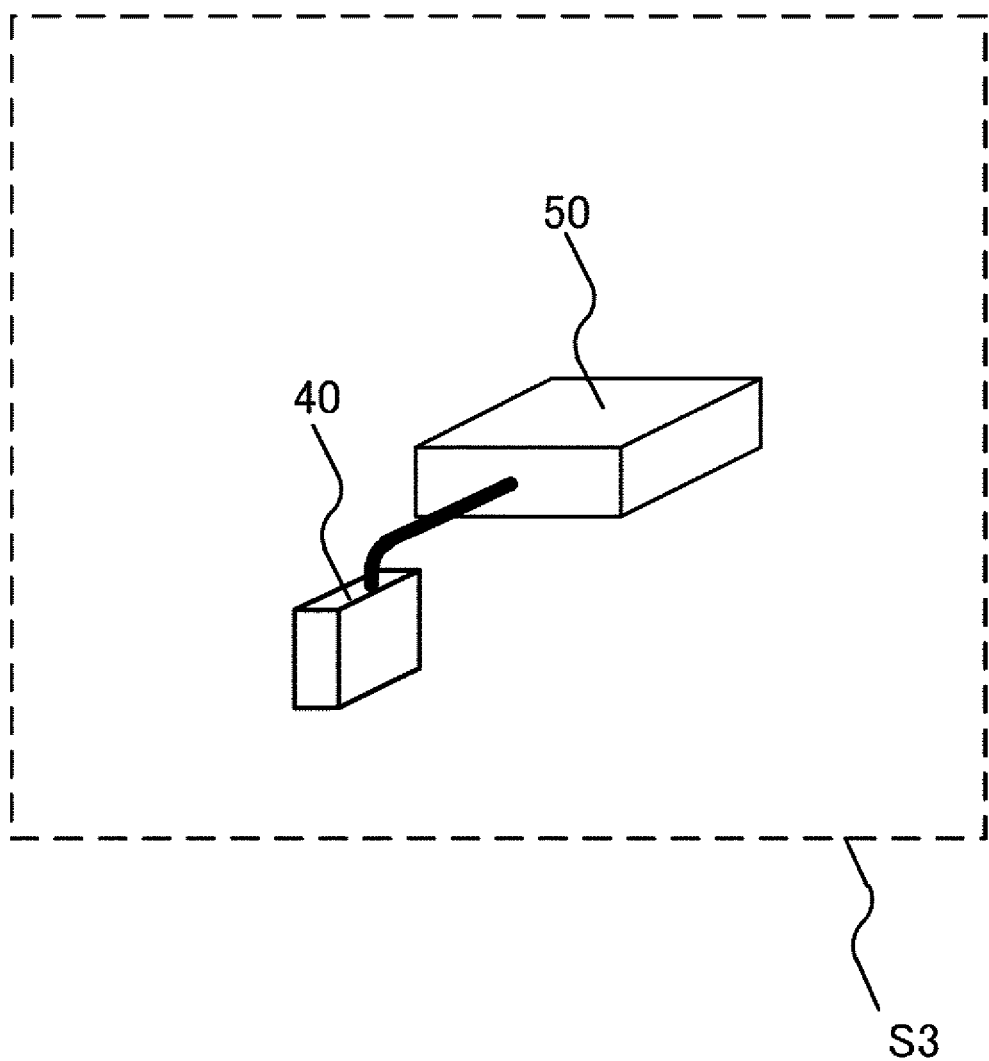
FIG. 5 is a schematic perspective view illustrating a power receiving device of the wireless power transmission device of the first embodiment of the present invention.
Figure 6:
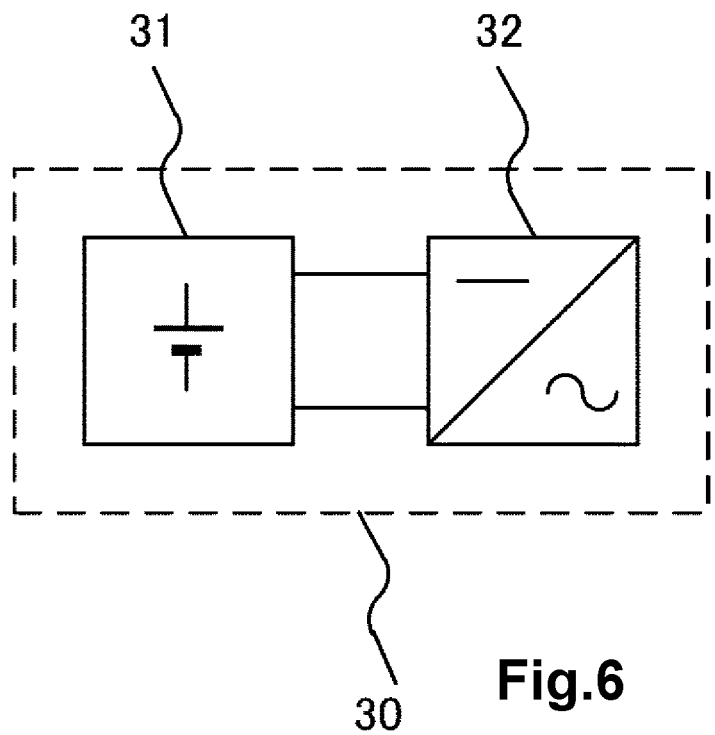
FIG. 6 is a schematic functional block diagram illustrating a power supply device in the power feeding device of the wireless power transmission device of the first embodiment of the present invention.

First, the whole structure of wireless power transmission device S1 according to the first embodiment of the present invention is described with reference to FIG. 1 to FIG. 6. FIG. 1 is a schematic perspective view illustrating the wireless power transmission device according to the first embodiment of the present invention. FIG. 2 is a schematic perspective view illustrating a power feeding device of the wireless power transmission device according to the first embodiment of the present invention. FIG. 3 is a cross-sectional view of the power feeding device along the cutting line I-I of FIG. 2. FIG. 4 is a cross-sectional view of the magnetic structure along the cutting line II-II of FIG. 2. FIG. 5 is a schematic perspective view illustrating a power receiving device of the wireless power transmission device according to the first embodiment of the present invention. FIG. 6 is a schematic functional block diagram illustrating a power supply device in the power feeding device of the wireless power transmission device according to the first embodiment of the present invention. In addition, in FIG. 3 and FIG. 4, the representative magnetic flux as the magnetic flux generated from power feeding coil device 20 is indicated by arrows.

As shown in FIG. 1, FIG. 2 and FIG. 5, wireless power transmission device S1 comprises power feeding device S2 and power receiving device S3. Power feeding device S2 comprises magnetic structure 10, power feeding coil device 20 and power supply device 30. Power receiving device S3 comprises power receiving coil device 40 and output circuit portion 50. In addition, wireless power transmission device S1 can be applied to power feeding machines for various devices, for example power feeding machines for small electronic devices such as portable devices, power feeding machines for movable bodies such as electric vehicles or transportation equipments used in the factory, and elevators or the like.

First of all, power supply device 30 is described with reference to FIG. 6. Power supply device 30 has power supply 31 and power conversion circuit 32.

Power supply 31 supplies a direct-current power to power conversion circuit 32. As power supply 31, it is not particularly limited as long as it can output the direct-current power, and a DC power supply obtained by rectifying and smoothing commercial AC power supply, a secondary battery, a DC power supply obtained by photovoltaic generation, AC-DC converter output or the like can be listed.

Power conversion circuit 32 is connected to power supply 31, and has a function of converting the direct-current power input from power supply 31 into AC power. That is, power conversion circuit 32 functions as an inverter. Power conversion circuit 32 is constructed by a switching circuit in which a plurality of switching elements (not illustrated) are bridge connected. As this power conversion circuit 32, a full-bridge circuit, a half-bridge circuit, or the like can be listed. The AC power output from this power conversion circuit 32 is supplied to power feeding coil device 20.

Next, magnetic structure 10 and power feeding coil device 20 are described with reference to FIG. 1 to FIG. 4.

Magnetic structure 10 has two tabular magnetic bodies 11. Two magnetic bodies 11 respectively have an approximately rectangular parallelepiped external shape. As the external surfaces, two magnetic bodies 11 respectively have first and second main surfaces 11a, 11b with approximately rectangular shapes which face each other; the first and second side surfaces which extend along the long-side direction of first and second main surfaces 11a and 11b so as to connect first and second main surfaces 11a and 11b; and the first and second end surfaces which extend along the short-side direction of first and second main surfaces 11a and 11b so as to connect first and second main surfaces 11a and 11b. In two magnetic bodies 11, the mutual main surfaces (first main surfaces 11a) face each other, two magnetic bodies 11 are disposed to be separated at a predetermined distance. In the present embodiment, the mutual main surfaces of two magnetic bodies 11 are approximately parallel to each other. That is, two magnetic bodies 11 are disposed in such a manner that the distance between two magnetic bodies 11 is always constant. In addition, in the present embodiment, two magnetic bodies 11 have an approximately rectangular parallelepiped shape, but they are not limited thereto, and the two magnetic bodies can be properly set to be any shape based on the shape or the conformation of power receiving device S3 to which power is transmitted by power feeding device S2. In addition, the distance between two magnetic bodies 11 can be properly set based on the shape or the conformation of power receiving device S3 to which power is transmitted by power feeding device S2 as well as the electric energy which is supplied to power receiving device S3. Further, two magnetic bodies 11 can be disposed so that the opposite direction of the mutual main surfaces of the two magnetic bodies becomes a horizontal direction, and they also can be disposed so that the opposite direction becomes a vertical direction. As two magnetic bodies 11 constituted as above, the magnetic materials such as ferrite, permalloy, silicon steel plate, or the like can be listed. Moreover, the magnetic material with a higher relative permeability is more preferable, and the magnetic material with a relative permeability of 1000 or more is more preferably used. This is because if the relative permeability relative to the air is higher, the magnetic flux generated by power feeding coil device 20 will more efficiently pass through the inside of two magnetic bodies 11 and thus the power transmission efficiency can be improved. Besides, the magnetic material can select a magnetic material in which the core loss is small responding to the frequency of the alternating current that is supplied from power conversion circuit 32 to power feeding coil device 20. The reason is considered that the core loss is less, the heat generation of two magnetic bodies 11 can be more suppressed. For example, when the frequency of the alternating current which is supplied from power conversion circuit 32 to power feeding coil device 20 is several kHz to several hundred kHz, the magnetic material is preferably constructed by ferrite. When the frequency of the alternating current which is supplied from power conversion circuit 32 to power feeding coil device 20 is a commercial one, the magnetic material is preferably constructed by silicon steel plate.

Figure 7A:
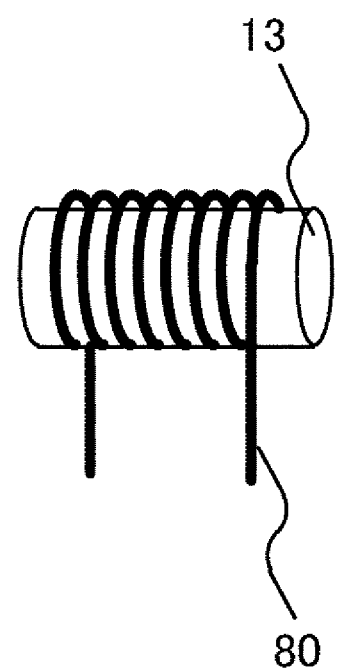
FIG. 7a is a schematic perspective view illustrating an example of the structure in which a conducting wire of the power feeding coil in the power feeding coil device is helically wound.
Figure 7B:
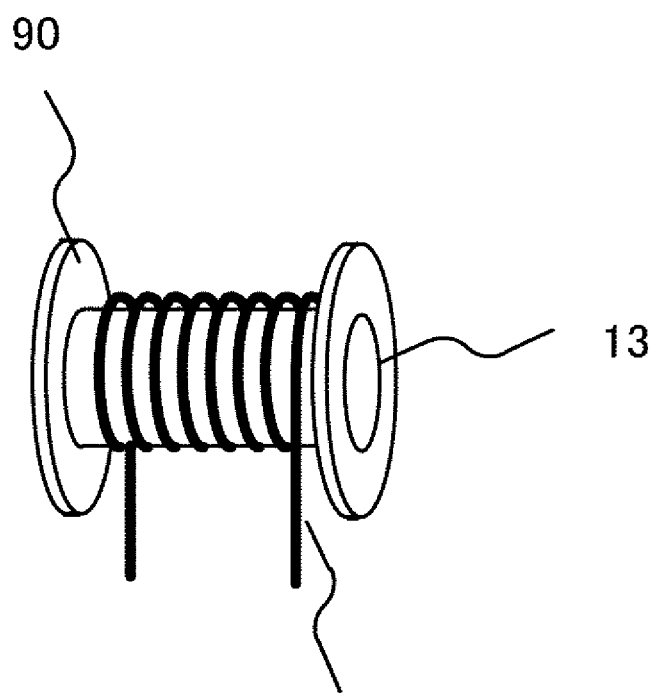
FIG. 7b is a schematic perspective view illustrating another example of the structure in which a conducting wire of the power feeding coil in the power feeding coil device is helically wound.
Figure 8A:
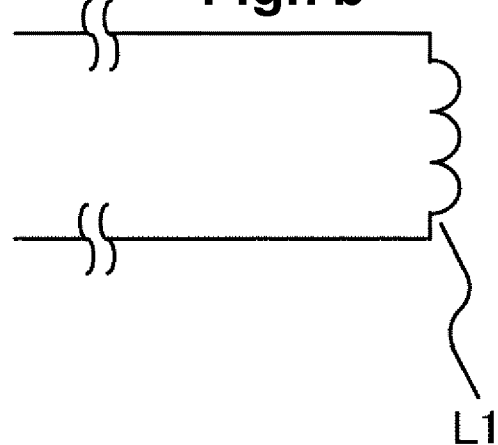
FIG. 8a is a schematic circuit structure diagram illustrating an example of a circuit structure of the power feeding coil device.
Figure 8B:
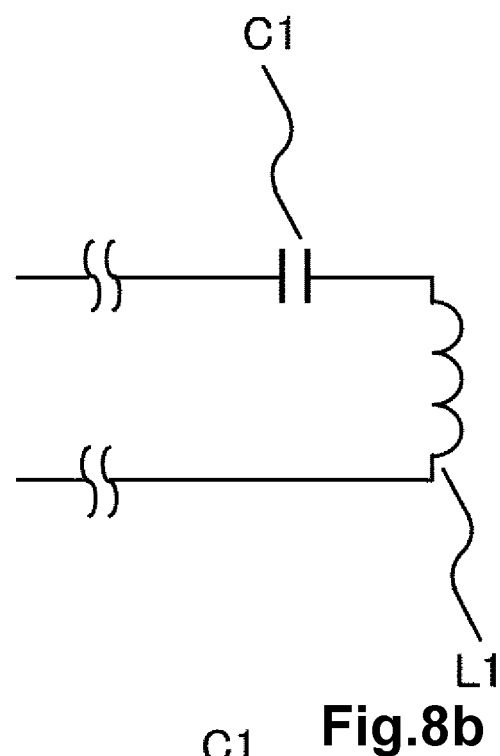
FIG. 8b is a schematic circuit structure diagram illustrating the first modified example of the circuit structure of the power feeding coil device.
Figure 8C:
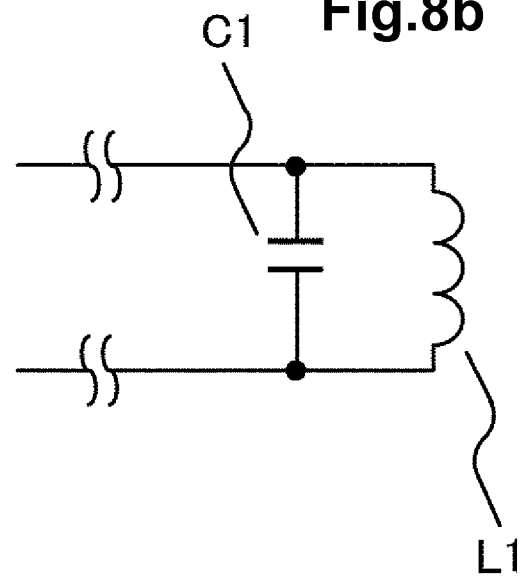
FIG. 8c is a schematic circuit structure diagram illustrating the second modified example of the circuit structure of the power feeding coil device.
Figure 8D:
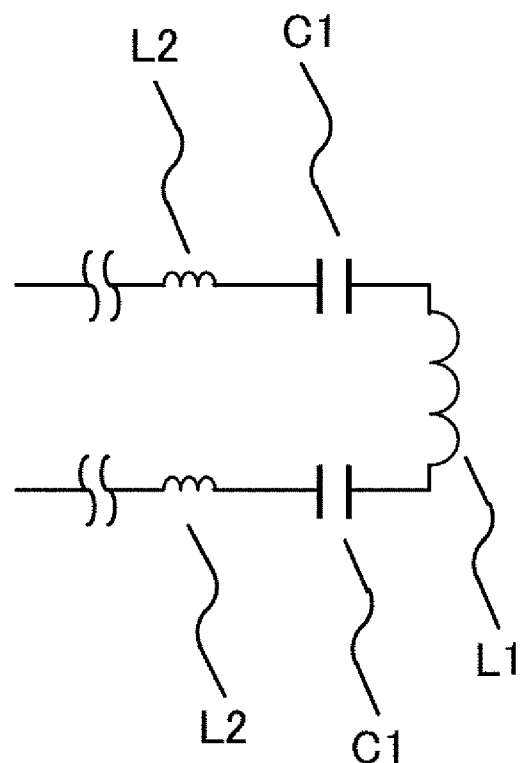
FIG. 8d is a schematic circuit structure diagram illustrating the third modified example of the circuit structure of the power feeding coil device.
Figure 8E:
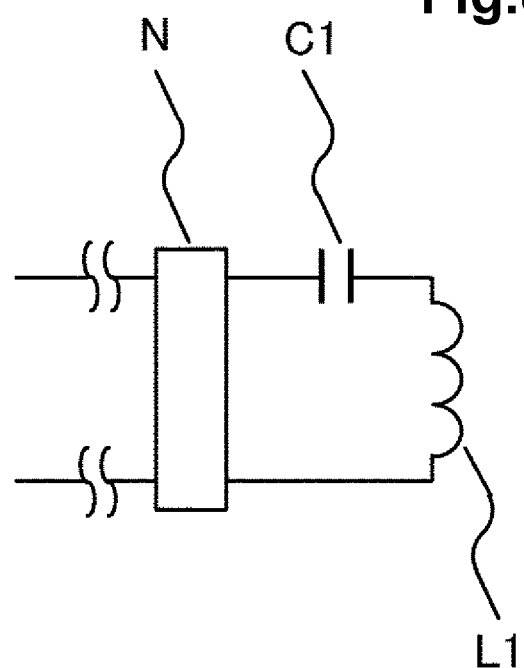
FIG. 8e is a schematic circuit structure diagram illustrating the fourth modified example of the circuit structure of the power feeding coil device.

Power feeding coil device 20 is connected to power conversion circuit 32, and functions as a power feeding portion which wireless transmits the AC power supplied from power conversion circuit 32 to power receiving coil device 40. In particular, power feeding coil device 20 includes a power feeding coil constructed by winding a conducting wire, and a housing with insulation for housing the power feeding coil. If an alternating voltage is applied from power conversion circuit 32 to the power feeding coil, an alternating current flows to generate an alternating magnetic field. That is, power feeding coil device 20 receives power from power supply 31 and generates the alternating magnetic field. Herein, the structure of power feeding coil device 20 is described in detail with reference to FIG. 7 and FIG. 8. FIG. 7a is a schematic perspective view illustrating an example of the structure in which a conducting wire of the power feeding coil in power feeding coil device 20 is helically wound. FIG. 7b is a schematic perspective view illustrating another example of the structure in which a conducting wire of the power feeding coil in power feeding coil device 20 is helically wound. FIG. 8a is a schematic circuit structure diagram illustrating an example of a circuit structure of power feeding coil device 20. FIG. 8b is a schematic circuit structure diagram illustrating the first modified example of the circuit structure of power feeding coil device 20. FIG. 8c is a schematic circuit structure diagram illustrating the second modified example of the circuit structure of power feeding coil device 20. FIG. 8d is a schematic circuit structure diagram illustrating the third modified example of the circuit structure of power feeding coil device 20. FIG. 8e is a schematic circuit structure diagram illustrating the fourth modified example of the circuit structure of power feeding coil device 20. The power feeding coil of power feeding coil device 20 can be a coil with a helical structure obtained by winding a conducting wire to be a planar shape, and also can be a coil with a solenoid structure obtained by helically winding a conducting wire. As the conducting wire, it can be listed as the metal wire such as copper, silver, gold, aluminum, or the like. The conducting wire can comprise a unifilar metal wire, and also can comprise a litz wire obtained by twisting a plurality of metal wire together. In addition, the winding number of the conducting wire of the power feeding coil can be properly set based on the desired power transmission efficiency or the like. However, the efficiency of the wireless power transmission trends to be better when the coil has a higher Q value. As shown in FIG. 7a, when the power feeding coil is constructed by the coil having a solenoid structure, it can be constructed by helically winding conducting wire 80 on magnetic core 13. Thus, the Q value of the power feeding coil can be improved by using magnetic core 13 in the power feeding coil. Specifically, when the case that the power feeding coil includes magnetic core 13 and the case that the power feeding coil does not include magnetic core 13 are compared, the winding number of conducting wire 80 of the power feeding coil can be decreased in the case including magnetic core 13 in order to manufacture the power feeding coil with the same inductance value. Hence, the resistance value of the power feeding coil also can be reduced and the power loss caused by the resistance can be decreased. That is, when the resistance value of the power feeding coil is lowered, the Q value of the power feeding coil will increase and the power transmission efficiency can be enhanced. In addition, when the power feeding coil includes magnetic core 13, it is essential to ensure the insulation between conducting wire 80 of the power feeding coil and magnetic core 13 if magnetic core 13 is constructed by non-insulating material. For example, the insulation can be ensured by a structure obtained by coating magnetic core 13 with an insulating tape (such as Kempton tape) and then winding conducting wire 80 thereon; the insulation also can be ensured when conducting wire 80 of the power feeding coil itself comprises insulating coating conductor such as polyethylene insulated wire or vinyl insulated wire which have been covered with an insulator. Alternatively, as shown in FIG. 7b, conducting wire 80 of the power feeding coil and magnetic core 13 can be insulated with a simple structure when magnetic core 13 is inserted inside bobbin 90 made of a hollow cylindrical insulating material and then conducting wire 80 is wound on the outer peripheral surface of bobbin 90. At that time, as shown in FIG. 7b, a flange can be disposed at the two end portions at the axial direction of the power feeding coil of bobbin 90. In this way, conducting wire 80 wound on the outer peripheral surface of bobbin 90 can be prevented from dropping from bobbin 90.

Moreover, power feeding coil device 20 is constructed by various circuit elements comprising coil L1. For example, power feeding coil device 20 also can be only constructed by coil L1 as shown in FIG. 8a. Alternatively, power feeding coil device 20 comprises capacitor C1, which is connected to coil L1 and forms a resonance circuit with coil L1. For example, as shown in FIG. 8b, power feeding coil device 20 can be constructed in a manner that capacitor C1 is connected in series with coil L1 to form the resonance circuit; besides, as shown in FIG. 8c, power feeding coil device 20 also can be constructed in a manner that capacitor C1 is connected in parallel with coil L1 to form the resonance circuit. Further, as shown in FIG. 8d, power feeding coil device 20 is constructed in a manner that the two ends of coil L1 are respectively connected in series with capacitor C1 to form the resonance circuit and these capacitors C1 are connected in series with inductor L2. The resonance frequency of the resonance circuit can be determined based on inductance value and capacitance value. When inductors L2 are not connected in series, the inductance value of the resonance frequency is the value of leakage inductance of coil L1. The value of leakage inductance is determined by a coupling coefficient K showing the coupling degree of coil L1 of power feeding coil device 20 and the coil of power receiving coil device 40, and the value can be represented by the formula $(1-K) \times L1$. It can be known from the formula that the value of the leakage inductance will make a great change when the coupling coefficient K changes significantly. Thus, the resonance frequency also will make a big change. On the other hand, if capacitor C1 of the resonance circuit is connected in series with inductor L2, the inductance value of the resonance frequency will be $((1-K) \times L1)+L2$. In this instance, if the inductance value of inductor L2 is large to a certain extent, the change of the inductance value of the resonance frequency can be suppressed to some extent even the coupling coefficient K changes greatly. That is, the change of the resonance frequency can be reduced by including inductor L2. Further, as shown in FIG. 8e, power feeding coil device 20 can be constructed in a manner that the power feeding coil is connected in series to capacitor C1 to form the resonance circuit and then the resonance circuit is connected with noise filter N such as common mode choke coil which aims to reduce the noise.

Power feeding coil device 20 is disposed at any position between two magnetic bodies 11. Thus, the magnetic flux generated by power feeding coil device 20 passes through two magnetic bodies 11 and then returns back to go around during power transmission. At that time, the magnetic flux (which is generated from power feeding coil device 20 and flows towards one magnetic body 11 of two magnetic bodies 11) is radiated from the whole surface of magnetic body 11 to the air. That is, two magnetic bodies 11 receive the alternating magnetic field generated by power feeding coil device 20 during power transmission, a power feeding region is formed between two magnetic bodies 11, and the power feeding region can transmit power to power receiving coil device 40 mentioned below. Moreover, from the viewpoint of making the magnetic flux from power feeding coil device 20 efficiently flow into two magnetic bodies 11, power feeding coil device 20 is preferably disposed so that the axial direction of the coil axis of the power feeding coil in power feeding coil device 20 is approximately parallel to the opposite direction of the mutual main surfaces of two magnetic bodies 11.

Power receiving coil device 40 functions as a power receiving portion of receiving wirelessly the alternating current power from power feeding coil device 20. In particular, power receiving coil device 40 includes power receiving coil constructed by winding a conducting wire, and a housing with insulation for housing the power receiving coil. As the conducting wire, it can be listed as the metal wire such as copper, silver, gold, aluminum, or the like. The conducting wire can comprise an unifilar metal wire, and also can comprise a litz wire obtained by twisting a plurality of metal wires together. In addition, the winding number of the conducting wire of the power receiving coil can be properly set based on the desired power transmission efficiency or the like. Just like the power feeding coil of power feeding coil device 20, the power receiving coil of power receiving coil device 40 can be a coil with a helical structure obtained by winding a conducting wire to be a planar shape, and also can be a coil with a solenoid structure obtained by helically winding a conducting wire. And when the power receiving coil has a solenoid structure, the power receiving coil can include a magnetic core. In addition, just like power feeding coil device 20, power receiving coil device 40 is constructed by various circuit elements having a coil and it also can be only constructed by a coil. Power receiving coil device 40 can comprise a capacitor which is connected in series or in parallel with the coil to form a resonance circuit with the coil. Power receiving coil device 40 also can comprise an inductor or noise filter except the coil. If the magnetic flux (which is radiated from the surface of magnetic body 11 to the air) interlinks with the power receiving coil of power receiving coil device 40, an electromotive force is generated in power receiving coil and an alternating current flows. The alternating current flowing in the power receiving coil of power receiving coil device 40 is supplied to rectifier circuit 51 described below. In addition, from the viewpoint of efficiently interlinking with the magnetic flux, power receiving coil device 40 is preferably disposed so that the axial direction of the coil axis of the power receiving coil in power receiving coil device 40 is approximately parallel to the opposite direction of the mutual main surfaces of two magnetic bodies 11.

Figure 9:
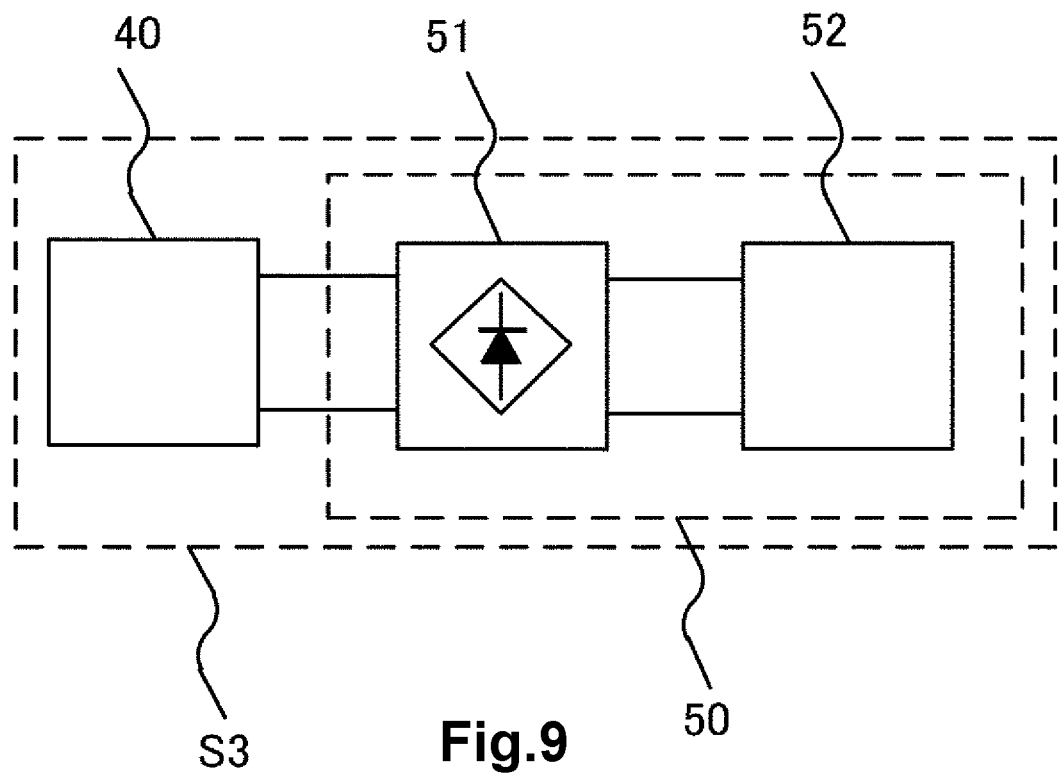
FIG. 9 is a schematic functional block diagram illustrating a power receiving device of the wireless power transmission device of the first embodiment of the present invention.

Subsequently, output circuit portion 50 is described with reference to FIG. 9. FIG. 9 is a schematic functional block diagram illustrating a power receiving device of the wireless power transmission device of the first embodiment of the present invention. As shown in FIG. 9, output circuit portion 50 includes rectifier circuit 51 and load 52. Rectifier circuit 51 is connected with power receiving coil device 40, and it rectifies the AC power received by power receiving coil device 40 and outputs it to load 52. Rectifier circuit 51 is constructed by, for instance, a bridge diode (not illustrated) and a smoothing capacitor. Specifically, the alternating voltage outputted from power receiving coil device 40 is full-wave rectified by the bridge diode, and further the full-wave rectified voltage is smoothed by the smoothing capacitor. However, in the case that load 52 needs AC power, rectifier circuit 51 is not necessarily an essential component. In this instance, load 52 is directly connected with power receiving coil device 40, and the AC power received by power receiving coil device 40 is directly supplied to load 52 without rectifying and smoothing. In addition, although load 52 is needed to rectify AC power received by power receiving coil device 40, the smoothing capacitor of rectifier circuit 51 is not necessarily an essential component when smoothing is not needed. In this case, loading 52 is directly connected with the output terminal of the bridge diode of rectifier circuit 51, and the AC power received by power receiving coil device 40 is supplied to load 52 after being rectified. Moreover, in the present embodiment, it is not limited to the case that rectifier circuit 51 is connected to power receiving coil device 40, and rectifier circuit 51 can be connected with power receiving coil device 40 through a transformer.

Load 52 is connected to rectifier circuit 51 and works through the DC power outputted from rectifier circuit 51. In particular, it can be listed as a motor or the like. In addition, as load 20, a battery which stores the energy or the like can be listed. In the battery as load 52, rechargeable secondary battery (such as lithium-ion battery, lithium polymer battery, or nickel-hydrogen battery) and the like can be listed.

With such a structure, wireless power transmission device S1 is realized in which power can be wirelessly transmitted from power feeding device S2 to power receiving device S3.

Next, the magnetic flux generated by power feeding coil device 20 of the present embodiment is described in detail with reference to FIG. 3 and FIG. 4.

If an alternating voltage is applied to power feeding coil device 20 from power supply device 30, the alternating current based on the alternating voltage flows and an alternating magnetic field generates. Then, as shown in FIG. 3, the magnetic flux generated from power feeding coil device 20 goes around in such a manner that it flows from power feeding coil device 20 into one magnetic body 11, is radiated from all parts of first main surface 11a of magnetic body 11 to the air, flows into first main surface 11a of the other magnetic body 11, and then reaches power feeding coil device 20. At that time, magnetic structure 10 formed by two magnetic bodies 11 is made of the material with a much higher relative permeability than that of the air, so the magnetic flux generated from power feeding coil device 20 spreads to a distance along two magnetic bodies 11. Thus, the power feeding region which can carry out power transmission in a wide range is formed on first main surfaces 11a of two magnetic bodies 11. That is, power can be transmitted to power receiving coil device 40 in the power feeding region. In the present embodiment, power can be transmitted in the space between the mutual main surfaces (first main surfaces 11a) of two magnetic bodies 11. During transmitting power, i.e., during receiving power from power feeding device S2, power is transmitted to power receiving coil device 40 when power receiving coil device 40 is disposed in this space (the power feeding region formed between two magnetic bodies 11). Besides, power can also be transmitted even if power receiving coil device 40 moves in this space capable of transmitting power.

Herein, as mentioned above, the magnetic flux generated from power feeding coil device 20 goes around in such a manner that it flows into one magnetic body 11, is radiated from first main surface 11a of magnetic body 11 to the air, flows into first main surface 11a of the other magnetic body 11, and then reaches power feeding coil device 20. At that time, as shown in FIG. 4, the magnetic flux radiated from the end portion (upper portion or lower portion shown in the figure) of first main surfaces 11a of two magnetic bodies 11 slightly curves towards exterior and flows into the other magnetic body 11. Hence, even if power receiving coil device 40 does not completely move in the space between the mutual main surfaces (first main surfaces 11a) of two magnetic bodies 11 during power transmission, the magnetic flux can be interlinked and power receiving coil device 40 can receive power. That is, a part or the whole part of the coil device can be disposed outside of the space between the mutual main surfaces (first main surfaces 11a) of two magnetic bodies 11 as long as the region on which power receiving coil device 40 is disposed is a region which interlinks with the magnetic flux radiated from the surface of magnetic body 1 to the air.

Thus, power feeding device S2 of wireless power transmission device S1 according to the present embodiment is a device which wirelessly transmits power to power receiving device S3 equipped with power receiving coil device 40, and comprises magnetic structure 10 having two magnetic bodies 11 and power feeding coil device 20 which receives power from power supply 31 and generates an alternating magnetic field. The two magnetic bodies whose mutual main surfaces 11a face each other are disposed to be separated at a predetermined distance. Power feeding coil device 20 is disposed at any position between two magnetic bodies 11.

The power feeding region capable of transmitting power to power receiving coil device 40 is formed between two magnetic bodies 11 in which the alternating magnetic field is received during power transmission. Thus, the magnetic flux generated from power feeding coil device 20 (which is disposed between two magnetic bodies 11 of magnetic structure 10) flows into one magnetic body 11 of magnetic structure 10, is radiated from the whole surface of one magnetic body 11 to the air, and then flows into the other magnetic body 11 of magnetic structure 10 to go around. At that time, the power feeding region is formed between two magnetic bodies 11 of magnetic structure 10. Besides, if power receiving coil device 40 is disposed between two magnetic bodies 11, the magnetic flux radiated from magnetic body 11 is interlinked with power receiving coil device 40 and an induced electromotive force is generated in power receiving coil device 40. Therefore, power starts to be transmitted to power receiving coil device 40 at once without moving the power feeding coil by an actuator when power receiving coil device 40 is disposed between two magnetic bodies 11. As a result, unnecessary electricity consumption can be suppressed and the response until power starts transmitting to power receiving device S3 is high. Moreover, the magnetic flux (which is generated from power feeding coil device 20 and flows into one magnetic body 11 of magnetic structure 10) is radiated from the whole surface of magnetic body 11 to the air, so the power feeding region is formed in the whole region between two magnetic bodies 11. Thus, power can be transmitted even when power receiving coil device 40 moves between two magnetic bodies 11. Therefore, the arrangement range is broadened in which power can be transmitted to power receiving device S3, and even in the case that the position of power receiving device S3 always changes, power also can be transmitted.

The Second Embodiment

Figure 10:
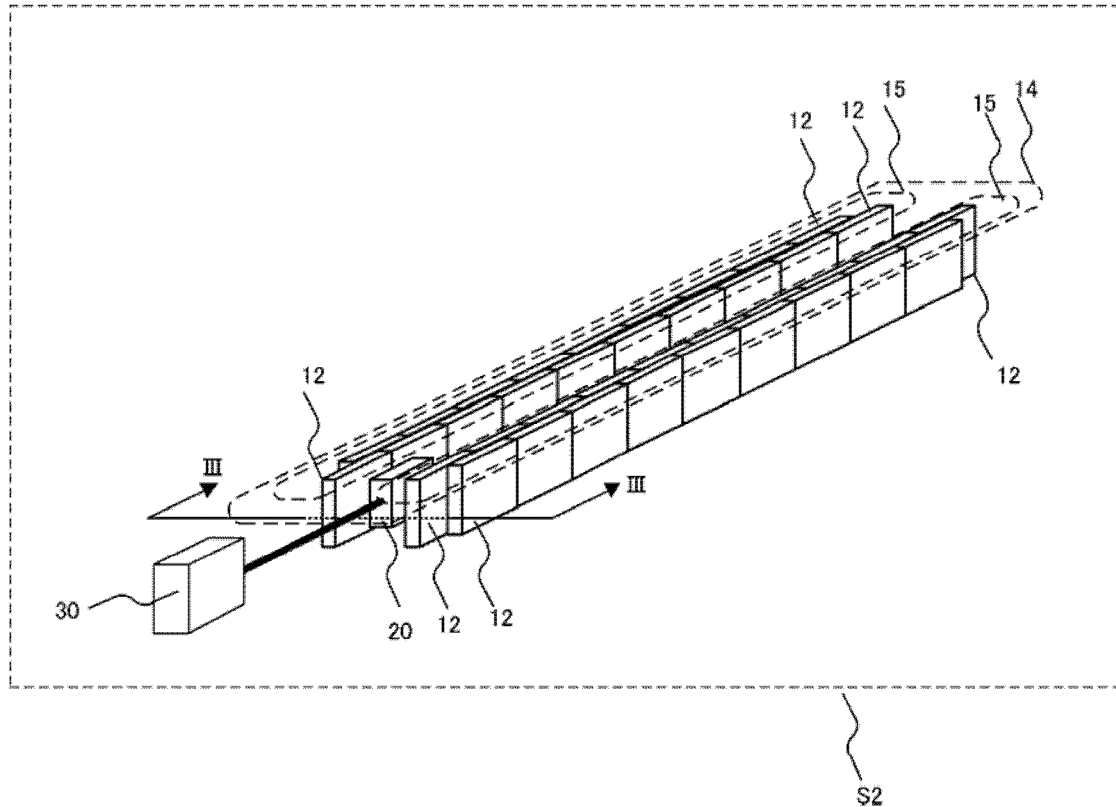
FIG. 10 is a schematic perspective view illustrating a power feeding device of the wireless power transmission device of the second embodiment of the present invention.
Figure 11:
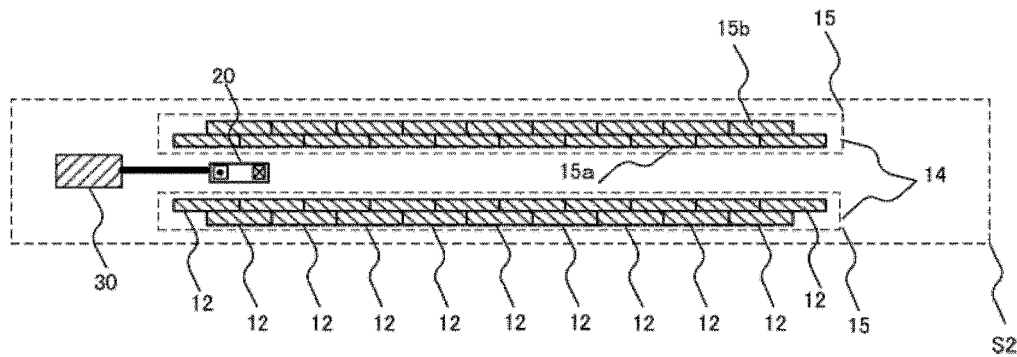
FIG. 11 is a cross-sectional view of the power feeding device along the cutting line of FIG. 10.

Next, the structure of the wireless power transmission device according to the second embodiment of the present invention is described with reference to FIG. 10 and FIG. 11. FIG. 10 is a schematic perspective view illustrating a power feeding device of the wireless power transmission device according to the second embodiment of the present invention. FIG. 11 is a cross-sectional view of the power feeding device along the cutting line of FIG. 10.

The wireless power transmission device of the second embodiment comprises power feeding device S2 and power receiving device S3, as same as wireless power transmission device S1 according to the first embodiment. Power feeding device S2 includes magnetic structure 14, power feeding coil device 20 and power supply device 30. Power receiving device S3 includes power receiving coil device 40 and output circuit portion 50. The constructions of power feeding coil device 20, power supply device 30, power receiving coil device 40 and output circuit portion 50 are the same as those in wireless power transmission device S1 according to the first embodiment. The wireless power transmission device according to the present embodiment is different from that of the first embodiment in the point that magnetic structure 14 is comprised to replace magnetic structure 10.

Figure 12:
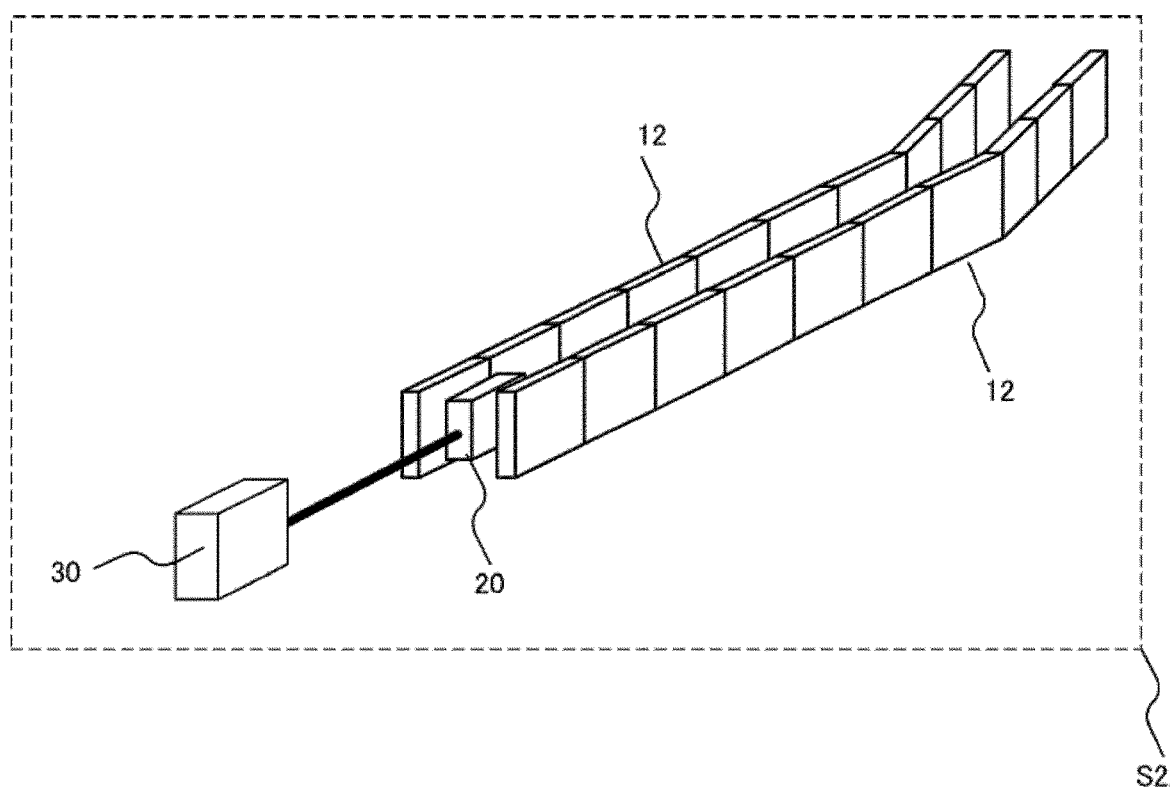
FIG. 12 is a schematic perspective view illustrating an application example of the magnetic structure in the power feeding device of the wireless power transmission device of the second embodiment of the present invention.

Magnetic structure 14 has two magnetic bodies 15. As shown in FIG. 10 and FIG. 11, two magnetic bodies 15 are respectively constructed by connecting a plurality of magnetic plates 12. Specifically, two magnetic bodies 15 are respectively constructed to be approximately rectangular parallelepiped shape as a whole by making rectangular parallelepiped shaped magnetic plates 12 with approximately square main surfaces line up in such a manner that the side surfaces of the adjacent magnetic plates 12 is connected with each other to form a column of magnetic plate, and then arranging overlappingly a plurality of (the number is two in the present embodiment) columns of magnetic plate in a manner that the main surfaces of each magnetic plate 12 face each other. The main surfaces of two magnetic bodies 15 are formed by the main surfaces of the plurality of magnetic plates 12 which are disposed at the outermost. Herein, as shown in FIG. 11, among the plurality of columns of magnetic plate which are arranged to be overlapped, magnetic plates 12 which forms one column of magnetic plate and magnetic plates 12 which forms the other column of magnetic plate are disposed so that the mutual central portions do not overlap with each other. In this way, the magnetic path resistance of magnetic body 15 can be decreased. By decreasing the magnetic path resistance, the magnetic flux generated from power feeding coil device 20 can efficiently pass through the inside of two magnetic bodies 15, and thus the power transmission efficiency is improved. Thus, it can be constructed to make the mutual central portions overlap with each other, and they can also be disposed so that their mutual central portions do not overlap with each other. The main surfaces of the plurality of magnetic plates 12 which forms magnetic body respectively face each other, i.e., the main surfaces of two magnetic bodies 15 face each other, and two magnetic bodies 15 are disposed to be separated at a predetermined distance. In the present embodiment, the mutual main surfaces of two magnetic bodies 15 are approximately parallel to each other. In addition, two magnetic bodies 15 in the present embodiment have an approximately rectangular parallelepiped shape, but they are not limited thereto, and two magnetic bodies 15 can be properly set to be any shape based on the shape or the conformation of power receiving device S3 to which power is transmitted by power feeding device S2. In addition, the distance between two magnetic bodies 15 can be properly set based on the shape or the conformation of power receiving device S3 to which power is transmitted by power feeding device S2 as well as the electric energy which is supplied to power receiving device S3. Further, two magnetic bodies 15 can be disposed so that the opposite direction of the mutual main surfaces of two magnetic bodies 15 is horizontal, and they also can be disposed so that the opposite direction is vertical. As a plurality of magnetic plates 12 which form two magnetic bodies 15, they can be listed as the magnetic materials such as ferrite, permalloy, silicon steel plate, or the like. Besides, the material with a higher relative permeability is more preferable, and the magnetic material with a relative permeability of 1000 or more is more preferably used. In addition, the plurality of magnetic plates 12 can comprise single magnetic material, and they also can comprise different magnetic materials, respectively. However, in the present embodiment, since two magnetic bodies 15 are constructed by a plurality of magnetic plates 12, the shape of the main surface of two magnetic bodies 15 can be changed at random. Herein, an application example, in which the shape of the main surface of two magnetic bodies 15 has been changed, is described with reference to FIG. 12. FIG. 12 is a schematic perspective view illustrating an application example of the magnetic structure in the power feeding device of the wireless power transmission device according to the second embodiment of the present invention. As shown in FIG. 12, the main surface of two magnetic bodies 15 can be changed from plane into curved surface by connecting the side surface of the adjacent magnetic plates 12 at a state of being partly inclined in the columns of magnetic plate which form two magnetic bodies 15. In addition, although it is not illustrated in the figure, the shape of the main surface of two magnetic bodies 15 also can be changed by producing the main surfaces of the plurality of magnetic plate 12 forming two magnetic bodies 15 into bent surface or curved surface.

As mentioned above, in the wireless power transmission of the present embodiment, two magnetic bodies 15 respectively comprise a plurality of magnetic plates 12. The magnetic body usually trends to deform easily during production if the shape of the magnetic body becomes large, and thus yield reduces and it becomes expensive. On the contrary, when magnetic body 15 comprises a plurality of magnetic plates 12, the yield can be prevent from reducing and the low cost can be realized.

The Third Embodiment

Figure 13:
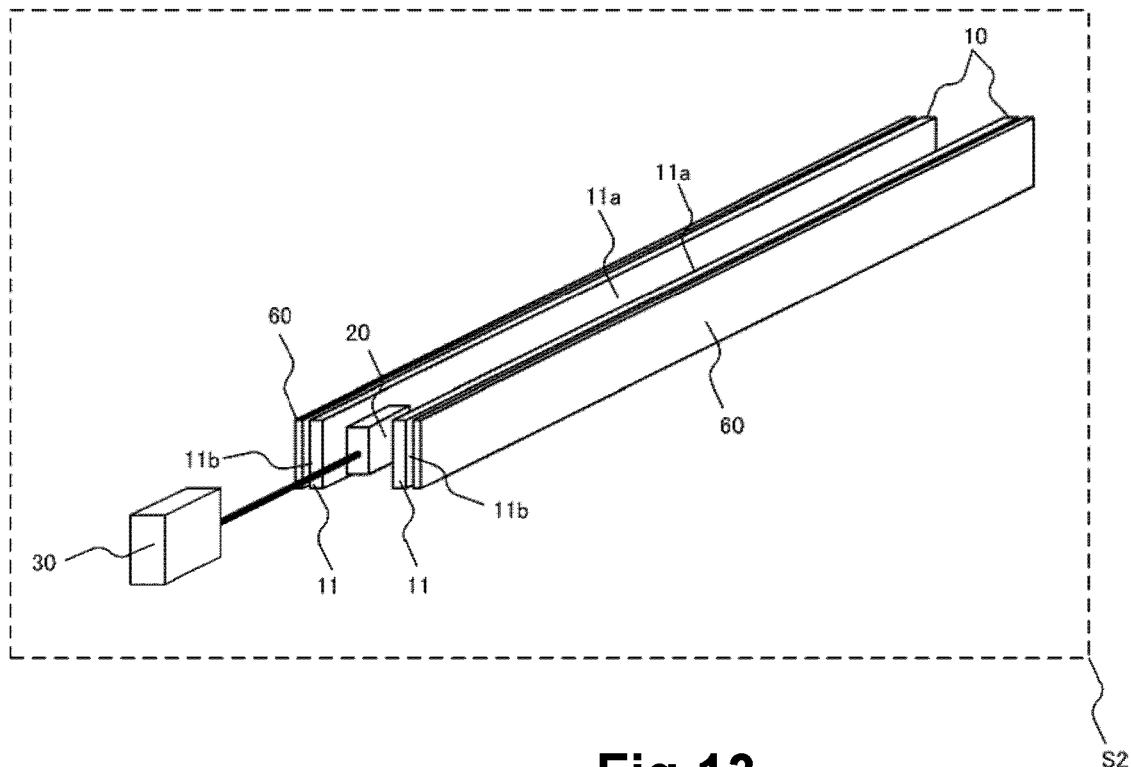
FIG. 13 is a schematic perspective view illustrating a power feeding device of the wireless power transmission device of the third embodiment of the present invention.

Next, the structure of the wireless power transmission device according to the third embodiment of the present invention is described with reference to FIG. 13. FIG. 13 is a schematic perspective view illustrating a power feeding device of the wireless power transmission device according to the third embodiment of the present invention.

The wireless power transmission device of the third embodiment comprises power feeding device S2 and power receiving device S3, as same as wireless power transmission device S1 according to the first embodiment. Power feeding device S2 includes magnetic structure 10, power feeding coil device 20, power supply device 30 and electromagnetic shielding material 60. Power receiving device S3 includes power receiving coil device 40 and output circuit portion 50. The constructions of magnetic structure 10, power feeding coil device 20, power supply device 30, power receiving coil device 40 and output circuit portion 50 are the same as those in wireless power transmission device S1 according to the first embodiment. The wireless power transmission device according to the present embodiment is different from that of the first embodiment in the point that electromagnetic shielding material 60 is further comprised.

Electromagnetic shielding material 60 has a function of decreasing noise to leak to the outside. Electromagnetic shielding material 60 in the present embodiment includes two electromagnetic shielding materials 60. Two electromagnetic shielding materials 60 are respectively disposed at the surface sides (the sides of second main surface 11b) opposite to the side where the mutual main surface of two magnetic bodies 11 face each other. Specifically, two electromagnetic shielding materials 60 are respectively disposed at the surface side opposite to the side where one magnetic body 11 and the other magnetic body 11 face each other and the surface side opposite to the side where the other magnetic body 11 and one magnetic body 11 face each other. That is, two electromagnetic shielding materials 60 are disposed so as to sandwich two magnetic bodies 11 from the outsides. Two electromagnetic shielding materials 60 are respectively tabular, and their external shape exhibits approximately rectangular parallelepiped. Two electromagnetic shielding materials 60 in the present embodiment respectively have the same shape as that of two magnetic bodies 11, but it is not limited thereto. It is not particularly limited as long as it is a shape covering second main surfaces 11b of each of magnetic bodies 11. In addition, the size of each of two electromagnetic shielding materials 60 can be larger than that of each of two magnetic bodies 11; conversely the size of each of two electromagnetic shielding materials 60 also can be smaller than that of each of two magnetic bodies 11. Further, two electromagnetic shielding materials 60 can be disposed so as to close to two magnetic bodies 11, and they also can be disposed to be separated at a predetermined distance between the electromagnetic shielding material and the magnetic body. Besides, they also can be disposed to hold an insulating member between the electromagnetic shielding material and the magnetic body. The material for two electromagnetic shielding materials 60 with such construction is not particularly limited as long as it can prevent noise from leaking towards the outside. For example, the electromagnetic shielding material can comprise a conducting material such as aluminum, titanium, iron, copper, or the like. And, it also can comprise magnetic sheet such as ferrite which inhibits noise. Moreover, it is preferable in the present embodiment that electromagnetic shielding materials 60 are respectively disposed on the surface side opposite to the side where the mutual main surfaces of two magnetic bodies 11 face each other, but the electromagnetic shielding materials also can be only disposed on the opposite surface side (the side of second main surface 11b) of the magnetic body 11 which is desired to prevent noise from leaking.

Herein, the effect of reducing the leakage noise is described in detail in the case that electromagnetic shielding material 60 comprises the conducting material. The magnetic flux generated from power feeding coil device 20 goes around in such a way that it flows into one magnetic body 11, is radiated from all parts of first main surface 11a of magnetic body 11 to the air, flows into first main surface 11a of the other magnetic body 11, and then reaches power feeding coil device 20. At that time, as the magnetic body 11 has a higher relative permeability than the air, much magnetic flux passes through the inside of magnetic body 11. However, a part of magnetic flux leaks from second main surface 11b at the surface side opposite to first main surface 11a (i.e. the opposite surface of two magnetic bodies 11). The leaked magnetic flux sometimes will become noise. In the present embodiment, conductive electromagnetic shielding material 60 is provided on the side of second main surface 11b at the surface side opposite to first main surface 11a (i.e., the opposite surface of two magnetic bodies 11). Thus, the magnetic flux leaked from the magnetic bodies will pass through conductive electromagnetic shielding material 60. At that time, an eddy current flows to conductive electromagnetic shielding material 60 to eliminate the magnetic flux passing through the shielding material. Therefore, the magnetic flux will not leak to the outside of conductive electromagnetic shielding material 60, and thus the noise can be reduced.

Next, the effect of reducing the leakage noise is described in the case that electromagnetic shielding material 60 comprises the magnetic sheet. A part of magnetic flux which leaks from second main surface 11b at the surface side opposite to first main surface 11a (i.e., the opposite surface of two magnetic bodies 11) flows into electromagnetic shielding material 60 comprising the magnetic sheet. The flux flows into the magnetic sheet because the magnetic sheet has a low magnetic path resistance, and then flows into second main surface 11b of magnetic body 11 again. Therefore, the magnetic flux will not leak to the outside of electromagnetic shielding material 60, and thus the noise can be reduced.

As described above, the wireless power transmission device according to the present embodiment includes conductive electromagnetic shielding materials 60 respectively disposed on the surface sides opposite to the side where the mutual main surfaces of two magnetic bodies 11 face each other. Hence, the noise leaking to the outside can be decreased by providing electromagnetic shielding material 60.

The Fourth Embodiment

Figure 14:
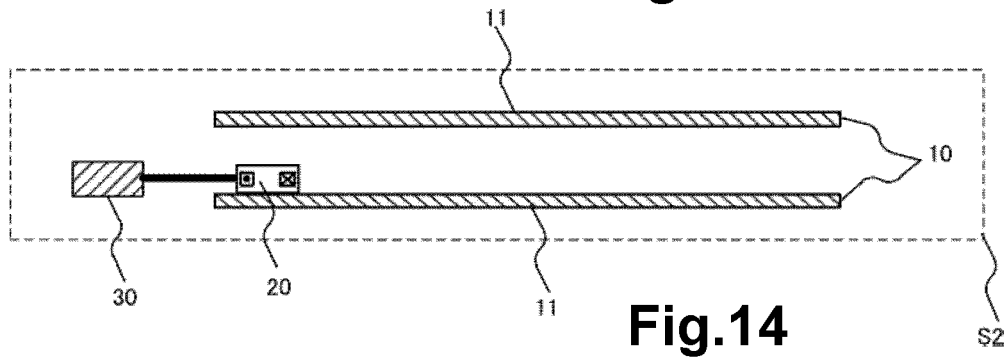
FIG. 14 is a cross-sectional view of the power feeding device of the wireless power transmission device of the fourth embodiment of the present invention, which corresponds to the cross-sectional view of the power feeding device of the wireless power transmission device of the first embodiment of the present invention as shown in FIG. 3.

Next, the structure of the wireless power transmission device according to the fourth embodiment of the present invention is described with reference to FIG. 14. FIG. 14 is a cross-sectional view of the power feeding device of the wireless power transmission device of the fourth embodiment of the present invention, which corresponds to the cross-sectional view of the power feeding device of the wireless power transmission device of the first embodiment of the present invention as shown in FIG. 3.

The wireless power transmission device of the fourth embodiment comprises power feeding device S2 and power receiving device S3, as same as wireless power transmission device S1 according to the first embodiment. Power feeding device S2 includes magnetic structure 10, power feeding coil device 20, and power supply device 30. Power receiving device S3 includes power receiving coil device 40 and output circuit portion 50. The constructions of magnetic structure 10, power feeding coil device 20, power supply device 30, power receiving coil device 40 and output circuit portion 50 are the same as those in wireless power transmission device S1 according to the first embodiment. The wireless power transmission device according to the present embodiment is different from that of the first embodiment in the point of the arrangement of power feeding coil device 20.

In the present embodiment, power feeding coil device 20 is disposed at any position between two magnetic bodies 11 so as to contact with one magnetic body 11 of magnetic bodies 11 through an insulating material. To be specific, one end surface of the power feeding coil of power feeding coil device 20 in the axial direction is disposed so as to contact with first main surface 11a of one magnetic body 11 of two magnetic bodies 11 through the insulating material. With respect to the insulating material existing between power feeding coil device 20 and magnetic body 11, a housing with insulation for housing the power feeding coil of power feeding coil device 20 can be used as the insulating material, and an insulating resin disposed between power feeding coil device 20 and magnetic body 11 also can be used as the insulating material. In addition, when the power feeding coil of power feeding coil device 20 is directly disposed on magnetic body 11, the conducting wire constituting the power feeding coil can be made of an insulating coating conductor, and the insulating coating can be used as the insulating material.

Next, the effect produced by the present embodiment is described in detail below. The inductance value of the power feeding coil of power feeding coil device 20 is influenced by magnetic body 11. That is, the inductance value of the power feeding coil changes depending on the distance between power feeding coil device 20 and magnetic body 11. Thus, if power feeding coil device 20 is disposed not to contact between two magnetic bodies 11, the inductance value of the power feeding coil also change when the arrangement position of power feeding coil device 20 has a slight change. If the inductance value of the power feeding coil changes, the electric power capable of feeding will be different. In the present embodiment, because power feeding coil device 20 is disposed to contact with one magnetic body 11 of two magnetic bodies 11 through the insulating material, the distance between power feeding coil device 20 and magnetic body 11 will not change even when the arrangement position of power feeding coil device 20 is changed in a direction perpendicular to the opposite direction of two magnetic bodies 11. Thus, the inductance value of the power feeding coil cannot change. That is, the deviation of the inductance value of the power feeding coil cased by the disposition of power feeding coil device 20 can be suppressed to be low. In addition, when power feeding coil device 20 comprises an capacitor forming a resonance circuit together with the power feeding coil, if the deviation of the inductance value of the power feeding coil is suppressed to be low as shown in the present embodiment, the deviation of the resonance frequency of the resonance circuit formed by the power feeding coil and the capacitor also can be suppressed to be low.

Figure 15:
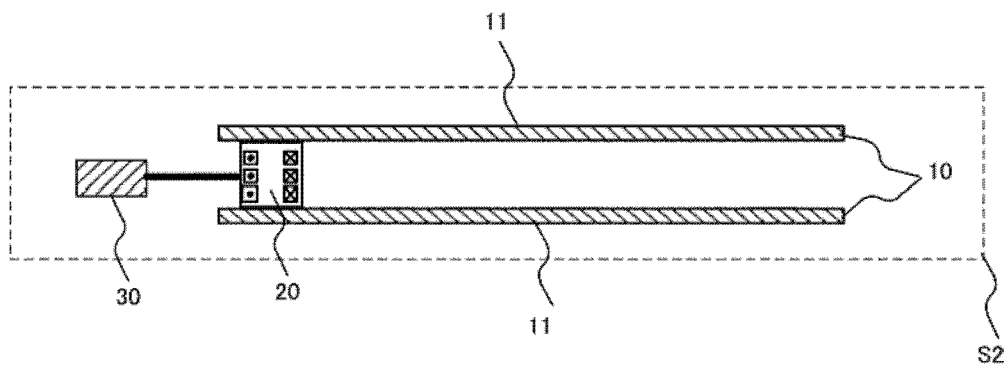
FIG. 15 is a cross-sectional view of the modified example of the power feeding device of the wireless power transmission device of the fourth embodiment of the present invention, which corresponds to the cross-sectional view of the power feeding device of the wireless power transmission device of the first embodiment of the present invention as shown in FIG. 3.

Herein, a modified example of the arrangement example of power feeding coil device 20 between two magnetic bodies 11 is described with reference to FIG. 15. FIG. 15 is a cross-sectional view of the modified example of the power feeding device of the wireless power transmission device of the fourth embodiment of the present invention, which corresponds to the cross-sectional view of the power feeding device of the wireless power transmission device of the first embodiment of the present invention as shown in FIG. 3. As shown in FIG. 15, in the present modified example, power feeding coil device 20 is disposed at any position between two magnetic bodies 11 so as to contact with both of two magnetic bodies 11 through the insulating material. To be specific, one end surface of the power feeding coil of power feeding coil device 20 in the axial direction is in contact with first main surface 11a of one of two magnetic bodies 11 through the insulating material, and the other end surface of the power feeding coil of power feeding coil device 20 in the axial direction is in contact with first main surface 11a of the other magnetic body 11 of two magnetic bodies 11 through the insulating material. In the present modified example, the inductance value of the power feeding coil cannot change. In addition, the construction in the present modified example is particularly effective in the case that the length in the opposite direction of two magnetic bodies 11 of power feeding coil device 20 is long. As such power feeding coil device 20, it can be exemplified as a device obtained by arranging overlappingly a plurality of power feeding coils with helical structure produced by winding the conducting wire to be a planar shape and then being put into a housing; a device obtained by putting the power feeding coil with solenoid structure produced by helically winding the conducting wire into a housing; a device obtained by putting a coil, which is produced by winding the conducting wire to be a planar shape and then further winding in layers, into a housing. Besides, power feeding coil device 20 also can be obtained by putting a power feeding coil with a helical structure producing by winding the conducting wire to be a planar shape into a rectangular parallelepiped housing whose long-side direction is the opposite direction of two magnetic bodies 11.

As described above, in the wireless power transmission device according to the present embodiment, power feeding coil device 20 is disposed to contact with at least one of two magnetic bodies 11 through the insulating material. The inductance value changes depending on the distance between power feeding coil device 20 and two magnetic bodies 11. Thus, when power feeding coil device 20 is disposed to contact with at least one of two magnetic bodies 11, the deviation of the distance between the magnetic body 11 and power feeding coil device 20 decreases, and thus the deviation of the inductance value caused by arrangement of power feeding coil device 20 can be reduced. If the deviation of the inductance value is suppressed to be lower, the deviation of the generated magnetic flux also can be suppressed to be lower. Thus, a stable power can be transmitted.

The Fifth Embodiment

Next, the structure of the wireless power transmission device of the fifth embodiment of the present invention is described. The construction of the wireless power transmission device according to the fifth embodiment is the same as that of the wireless power transmission device according to the first embodiment. In the wireless power transmission device of the fifth embodiment, power feeding coil device 20 is constructed to be capable of moving.

As mentioned above, power feeding coil device 20 in the present embodiment is constructed to be capable of moving. To be specific, power feeding coil device 20 is constructed to be capable of moving between two magnetic bodies 11. More specifically, power feeding coil device 20 is constructed to be capable of moving in the direction perpendicular to the opposite direction of two magnetic bodies 11. That is, power feeding coil device 20 is capable of moving in all directions as long as the direction is parallel to in-plane direction of first main surface 11a of magnetic body 11 such as long-side direction, short-side direction, diagonal direction or the like of magnetic body 11. In addition, power feeding coil device 20 also can be constructed to be capable of moving in the opposite direction of two magnetic bodies 11. In this case, as the distances between power feeding coil device 20 and two magnetic bodies 11 can be changed, the inductance value of the power feeding coil of power feeding coil device 20 can have a change. Power feeding coil device 20 can move through hand motion, and power feeding coil device 20 also can be constructed to be capable of self-moving. Power feeding device S2 equipped with power feeding coil device 20 is constructed by a movable body. Power feeding device 20 moves together with the movable body.

Herein, if the distance between power feeding coil device 20 and power receiving coil device 40 is far away, power which can be received from power feeding coil device 20 by power receiving coil device 40 reduces. In the present embodiment, since power feeding coil device 20 is constructed to be capable of moving, power feeding coil device 20 can move to approach to power receiving coil device 40. Thus, even when power receiving coil device 40 is arranged at any position between two magnetic bodies 11, a certain fixed amount or more of power can be received.

As described above, the wireless power transmission device of the present embodiment is constructed so that power feeding coil device 20 is capable of moving between two magnetic bodies 11. In the power feeding region apart away from power feeding coil device 20, the amount of the magnetic flux released from the surface of magnetic body 11 reduces. Therefore, the amount of power which can be received in the power feeding region apart away from power feeding coil device 20 reduces. On the contrary, when power feeding coil device 20 is constructed to be capable of moving, the power feeding region changes followed with the movement of power feeding coil device 20. That is, the power feeding region which can supply a certain fixed amount or more of power can be formed between the two magnetic bodies.

The Sixth Embodiment

Figure 16:
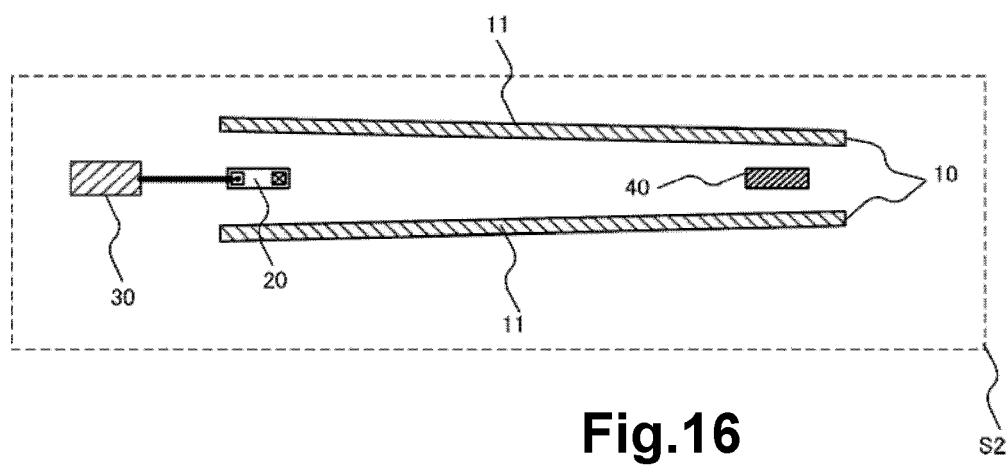
FIG. 16 is a cross-sectional view illustrating the power feeding device of the wireless power transmission device together with the power receiving device of the sixth embodiment of the present invention, which corresponds to the cross-sectional view of the power feeding device of the wireless power transmission device of the first embodiment of the present invention as shown in FIG. 3.

Next, the structure of the wireless power transmission device according to the sixth embodiment of the present invention is described with reference to FIG. 16. FIG. 16 is a cross-sectional view illustrating the power feeding device of the wireless power transmission device together with the power receiving device of the sixth embodiment of the present invention, which corresponds to the cross-sectional view of the power feeding device of the wireless power transmission device of the first embodiment of the present invention as shown in FIG. 3.

The wireless power transmission device of the sixth embodiment comprises power feeding device S2 and power receiving device S3, as same as wireless power transmission device S1 according to the first embodiment. Power feeding device S2 includes magnetic structure 10, power feeding coil device 20, and power supply device 30. Power receiving device S3 includes power receiving coil device 40 and output circuit portion 50. The constructions of magnetic structure 10, power feeding coil device 20, power supply device 30, power receiving coil device 40 and output circuit portion 50 are the same as those in wireless power transmission device S1 according to the first embodiment. The wireless power transmission device according to the present embodiment is different from that of the first embodiment in the point of the arrangement of magnetic structure 10.

Magnetic structure 10 has two tabular magnetic bodies 11. Two magnetic bodies 11 whose mutual main surfaces (first main surfaces 11a) face each other are disposed to be separated at a predetermined distance. In the present embodiment, as shown in FIG. 16, two magnetic bodies 11 are disposed so that the distance between two magnetic bodies 11 becomes short as leaving from the position where power feeding coil device 20 is disposed. Thus, two magnetic bodies 11 are disposed so that first main surface 11a of one magnetic body 11 is not parallel to first main surface 11a of the other magnetic body 11. That is, the angle formed by a virtual line extending along the long-side direction of first main surface 11a of one magnetic body 11 and a virtual line extending along the long-side direction of first main surface 11a of the other magnetic body 11 becomes acute. In addition, when two magnetic bodies 11 are constructed by single panel magnetic body in the present embodiment, the distance between two magnetic bodies 11 continuously becomes short as leaving from the position where power feeding coil device 20 is disposed. When two magnetic bodies 15 are constructed by a plurality of magnetic plates 12 in the second embodiment, the construction also can be formed in such a manner that the distance between two magnetic bodies 15 becomes short in stages as leaving from the position where power feeding coil device 20 is disposed.

However, the amount of the magnetic flux (generated from power feeding coil device 20) reaching to the position far away from power feeding coil device 20 reduces. On the other hand, if the distance between two magnetic bodies 11 becomes short, the magnetic flux flows easily. In the present embodiment, because two magnetic bodies 11 are disposed so that the distance between two magnetic bodies 11 becomes short as leaving from the position where power feeding coil device 20 is disposed, the distance between two magnetic bodies 11 is also short even at the position far away from power feeding coil device 20. Thus, the arrival amount of the magnetic flux generated from power feeding coil device 20 can be prevented from decreasing.

As described above, two magnetic bodies 11 in the wireless power transmission device of the present embodiment are disposed so that the distance between two magnetic bodies 11 becomes short as leaving from the position where power feeding coil device 20 is disposed. In the power feeding region far away from power feeding coil device 20, the amount of the magnetic flux released from the surface of the magnetic body 11 reduces. On the other hand, if the distance between two magnetic bodies 11 is shorted down, the amount of the magnetic flux increases which is released from the surface of magnetic body 11 of the shorted part. Therefore, when two magnetic bodies 11 are disposed so that the distance between two magnetic bodies 11 becomes short as leaving from the position where power feeding coil device 20 is disposed, the decrease amount of the magnetic flux amount released from the surface of magnetic body 11 in the power feeding region where is far away from power feeding coil device 20 can be reduced. As a result, the deviation of the amount of the magnetic flux released from the surface of magnetic bodies 11 can be suppressed (the deviation is caused by the position of the power feeding region), and a certain fixed amount or more of power can be stably supplied even in the case that the position of power receiving device S3 always changes.

The Seventh Embodiment

Figure 17:
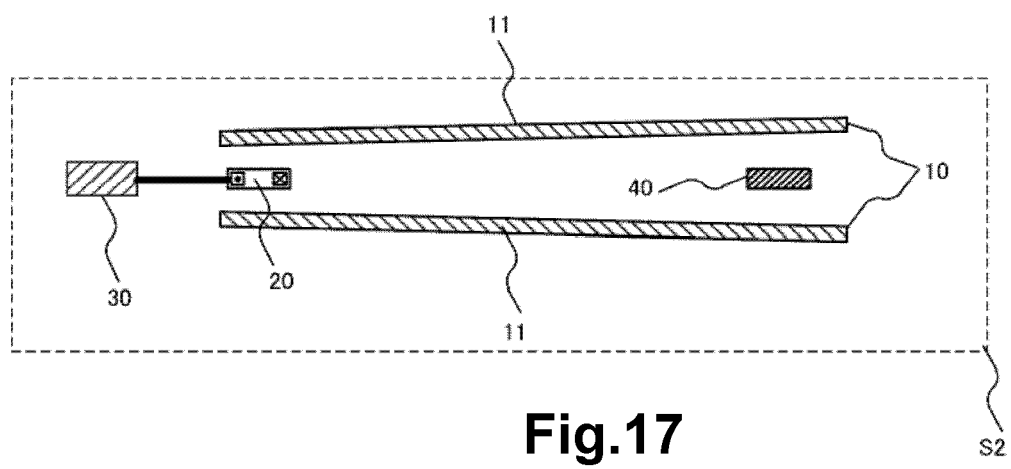
FIG. 17 is a cross-sectional view illustrating the power feeding device of the wireless power transmission device together with the power receiving device of the seventh embodiment of the present invention, which corresponds to the cross-sectional view of the power feeding device of the wireless power transmission device of the first embodiment of the present invention as shown in FIG. 3.

Next, the structure of the wireless power transmission device according to the seventh embodiment of the present invention is described with reference to FIG. 17. FIG. 17 is a cross-sectional view illustrating the power feeding device of the wireless power transmission device together with the power receiving device of the seventh embodiment of the present invention, which corresponds to the cross-sectional view of the power feeding device of the wireless power transmission device of the first embodiment of the present invention as shown in FIG. 3. The construction of the wireless power transmission device of the seventh embodiment is the same as that of the wireless power transmission device of the fifth embodiment. The wireless power transmission device according to the seventh embodiment is different from that of the fifth embodiment in the point of the arrangement of magnetic structure 10.

Magnetic structure 10 has two tabular magnetic bodies 11. Two magnetic bodies 11 whose mutual main surfaces (first main surfaces 11a) face each other are disposed to be separated at a predetermined distance. Herein, power feeding coil device 20 is constructed to be capable of moving, which is the same as that in the fifth embodiment. The example as shown in FIG. 17 is the state before power feeding coil device 20 moves, and power feeding coil device 20 can move to get close to power receiving coil device 40. That is, as shown in FIG. 17, two magnetic bodies 11 are disposed so that the distance between two magnetic bodies 11 becomes long towards the destination, to which power feeding coil device 20 moves in the present embodiment. Therefore, two magnetic bodies 11 are disposed so that first main surface 11a of one magnetic body 11 is not parallel to first main surface of the other magnetic body 11. In addition, when two magnetic bodies 11 are constructed by single panel magnetic body in the present embodiment, the distance between two magnetic bodies 11 continuously becomes long towards the destination, to which power feeding coil device 20 moves from the position before power feeding coil device 20 moves. When two magnetic bodies 15 is constructed by a plurality of magnetic plates 12 as shown in the second embodiment, the distance between two magnetic bodies 15 becomes long in stages towards the destination, to which power feeding coil device 20 moves from the position before power feeding coil device 20 moves.

In the case that power feeding coil device 20 moves as the present embodiment, if power feeding coil device 20 is close to power receiving coil device 40, the arrival amount of the magnetic flux generated from power feeding coil device 20 increases. That is, the transmission amount of power increases so that power is excessively transmitted. On the other hand, the magnetic flux hardly flows if the distance between two magnetic bodies 11 is broadened. In the present embodiment, two magnetic bodies 11 are disposed so that the distance between two magnetic bodies 11 becomes long towards the destination, to which power feeding coil device 20 moves. Therefore, the arrival amount of the magnetic flux generated from power feeding coil device 20 can be prevented from increasing by means of moving power feeding coil device 20 as the distance between two magnetic bodies 11 is long even if power feeding coil device 20 is positioned at the state of being close to power receiving coil device 40.

As described above, two magnetic bodies 11 in the wireless power transmission device of the present embodiment are disposed so that the distance between two magnetic bodies 11 becomes long towards the destination, to which power feeding coil device 20 moves. If power feeding coil device 20 moves to get close to the destination region to which power feeding coil device 20 moves compared to the state before power feeding coil device 20 moves, the amount of the magnetic flux released from the surface of magnetic body 11 between two magnetic bodies 11 increases. Thus, when power feeding coil device 20 is close in the destination region to which power feeding coil device 20 moves, the transmission amount of power increases and thus power is excessively transmitted. On the other hand, if the distance between two magnetic bodies 11 is broadened, the amount of the magnetic flux released from the surface of magnetic bodies 11 of the broadened part reduces. Therefore, when two magnetic bodies 11 are disposed so that the distance between two magnetic bodies 11 becomes long towards the destination to which power feeding coil device 20 moves, the increase amount of the magnetic flux amount released from the surface of magnetic bodies 11 at the destination region to which power feeding coil device 20 moves can be decreased. As a result, in the destination region to which power feeding coil device 20 moves, the deviation of the amount of the magnetic flux released from the surface of magnetic body 11 between two magnetic bodies 11 before and after power feeding coil device 20 moves can be suppressed, and a stable power can be supplied without supplying an excessive power.

The Eighth Embodiment

Figure 18:
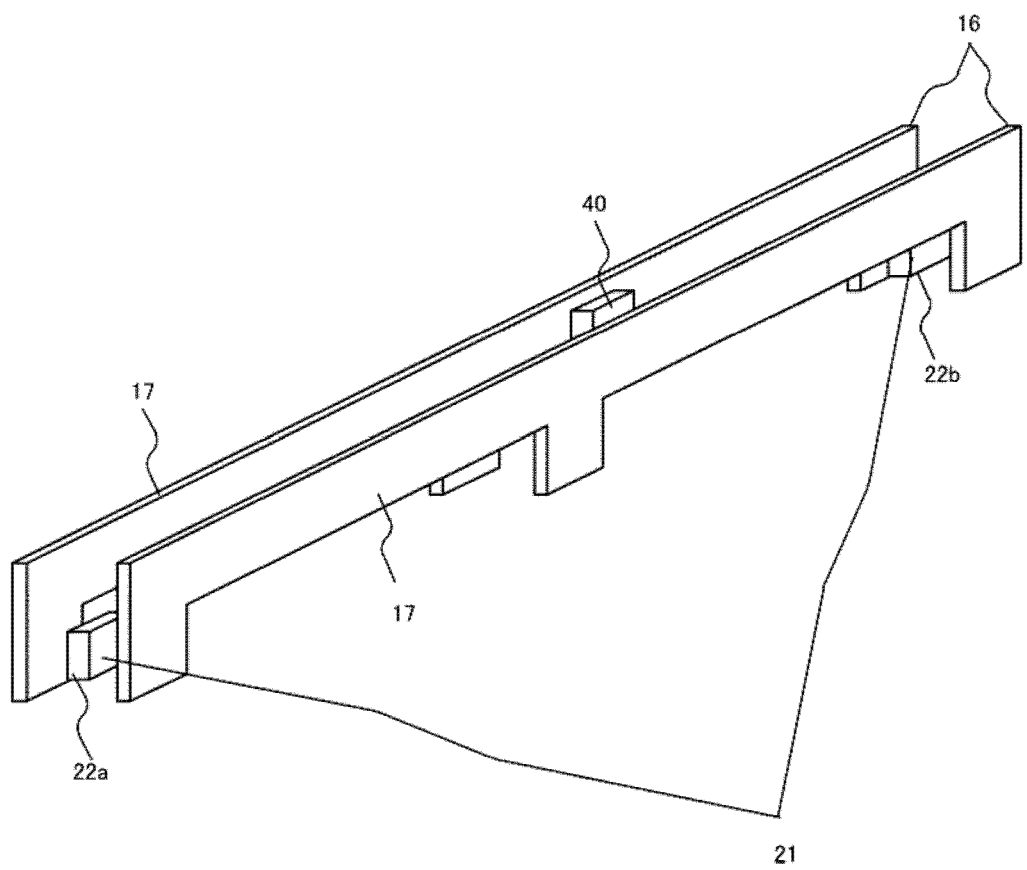
FIG. 18 is a schematic perspective view illustrating the power feeding device of the wireless power transmission device together with the power receiving device of the eighth embodiment of the present invention.

Next, the structure of the wireless power transmission device according to the eighth embodiment of the present invention is described with reference to FIG. 18. FIG. 18 is a schematic perspective view illustrating the power feeding device of the wireless power transmission device together with the power receiving device of the eighth embodiment of the present invention. The power supply device is omitted in FIG. 18 for convenience of illustration.

The wireless power transmission device of the eighth embodiment comprises power feeding device S2 and power receiving device S3, as same as wireless power transmission device S1 according to the first embodiment. Power feeding device S2 includes magnetic structure 16, power feeding coil device 21, and power supply device 30. Power receiving device S3 includes power receiving coil device 40 and output circuit portion 50. The constructions of power supply device 30, power receiving coil device 40 and output circuit portion 50 are the same as those in wireless power transmission device S1 according to the first embodiment. The power feeding device according to the present embodiment is different from that of the first embodiment in the point of comprising magnetic structure 16 to replace magnetic structure 10 and comprising power feeding coil device 21 to replace power feeding coil device 20.

Magnetic structure 16 has two tabular magnetic bodies 17. Two magnetic bodies 17 exhibit approximately E-shape which has a linear portion linearly extending along the horizontal direction and a projecting portion extending along the vertical direction from lower part of the central and the lower part of the two ends of the linear portions. That is, in the present embodiment, the main surfaces of two magnetic bodies 17 exhibit approximately E-shape. Two magnetic bodies 17 whose mutual main surfaces face each other are disposed to be separated at a predetermined distance. In the present embodiment, the mutual main surfaces of two magnetic bodies 17 are approximately parallel to each other. That is, two magnetic bodies 17 are always disposed with a constant distance between two magnetic bodies 11. In addition, two magnetic bodies 17 in the present embodiment exhibit approximately E-shape, but they are not limited thereto, and the two magnetic bodies can be properly set to be any shape based on the shape or the conformation of power receiving device S3 to which power is transmitted by power feeding device. In addition, the distance between two magnetic bodies 17 can be properly set based on the shape or the conformation of power receiving device S3 to which power is transmitted by power feeding device S2 as well as the electric energy which is supplied to power receiving device S3. Further, two magnetic bodies 17 can be disposed so that the opposite direction of the mutual main surfaces of two magnetic bodies 17 is horizontal, and they also can be disposed so that the opposite direction is vertical. As two magnetic bodies 17 constituted as above, they can be listed as the magnetic materials such as ferrite, permalloy, silicon steel plate, or the like. Moreover, the material with a higher relative permeability is more preferable, and the magnetic material with a relative permeability of 1000 or more is more preferably used.

Power feeding coil device 21 is connected to power conversion circuit 32, and functions as a power feeding portion which wirelessly transmits the AC power supplied from power conversion circuit 32 to power receiving coil device 40. Power feeding coil device 21 comprises a plurality of coil devices. In the present embodiment, power feeding coil device 21 is constructed by two coil devices 22a, 22b. Each of coil devices 22a, 22b includes a power feeding coil constructed by winding a conducting wire, and a housing with insulation for housing the power feeding coil, which is the same as power feeding coil device 20. If an alternating voltage is applied from power conversion circuit 32 to the power feeding coil, an alternating current flows to generate an alternating magnetic field. The power feeding coil can be a coil with a helical structure obtained by winding a conducting wire to be a planar shape, and also can be a coil with a solenoid structure obtained by helically winding a conducting wire. In the case of the power feeding coil with a solenoid structure, the power feeding coil can have a magnetic core. As the conducting wire, it can be listed as the metal wire such as copper, silver, gold, aluminum, or the like. The conducting wire can comprise a unifilar metal wire, and also can comprise a litz wire obtained by twisting a plurality of metal wire together. In addition, the winding number of the conducting wire of the power feeding coil can be properly set based on the desired power transmission efficiency or the like. Moreover, each of coil devices 22a, 22b can be constructed by various circuit elements comprising a coil and each of coil devices 22a and 22b also can be only constructed by a coil, which is the same as power feeding coil device 20. The coil device can comprise a capacitor (which is connected in series or in parallel with the coil) to form a resonance circuit together with the coil. Alternatively, the coil device also can comprise an inductor or a noise filter except the coil. These two coil devices 22a and 22b are respectively disposed at any position between two magnetic bodies 17. In the present embodiment, coil device 22a is disposed at the position between the main surfaces facing each other of the projecting portion extending from the lower part of one end of the linear portion in two magnetic bodies 17, and coil device 22b is disposed at the position between the main surfaces facing each other of the projecting portion extending from the lower part of the other end of two magnetic bodies 17. That is, two coil devices 22a and 22b are disposed in a manner that they do not overlap with each other when viewing from an opposite direction of two magnetic bodies 17. Thus, the magnetic flux generated by two coil devices 22a and 22b passes through two magnetic bodies 17 and then returns back to go around during power transmission. At that time, the magnetic flux (which is generated from coil device 22a and flows to one of two magnetic bodies 17 passes through magnetic body 17 from one end portion of the linear portion towards the other end portion in magnetic body 17, and then is radiated from the surface of magnetic body 17 to the air. On the other hand, the magnetic flux (which is generated by coil device 22b and flows to one of two magnetic bodies 17) passes through magnetic body 17 towards one end portion in magnetic body 17 from the other end portion of the linear portion, and then is radiated from the surface of magnetic body 17 to the air. That is, during power transmission, two magnetic bodies 17 receive the alternating magnetic field generated by coil device 22a, and a power feeding region is formed between two magnetic bodies 17, and the power feeding region can transmit power to power receiving coil device 40. And, two magnetic bodies 17 receive the alternating magnetic field generated by coil device 22b, a power feeding region is formed between two magnetic bodies 17, and the power feeding region can transmit power to power receiving coil device 40. Therefore, the amount of the magnetic flux generated from the surface of the magnetic body becomes an amount obtained by the magnetic flux (which is generated from coil device 22a and flows into the magnetic body) and the magnetic flux (which is generated from coil device 22b and flows into the magnetic body) being added, so the range of the power feeding region, in which the magnetic flux with a certain fixed amount or more is released from the surface of the magnetic body, is enlarged.

However, if power receiving coil device 40 is disposed at the position far away from power feeding coil device 21, the amount of the magnetic flux interlinked with power receiving coil device 40 among the magnetic flux generated from power feeding coil device 21 reduces. In the present embodiment, power feeding coil device 21 comprises a plurality of coil devices which do not overlap with each other when viewing from an opposite direction of two magnetic bodies 17, so these several coil devices respectively transmit power to power receiving coil device 40. Thus, a certain fixed amount or more of magnetic flux can be interlinked with power receiving coil device 40, and power with a certain fixed amount or more can be received. Power feeding coil device 21 in the present embodiment is constructed by two coil devices 22a and 22b, but it also can be constructed by three or more coil devices.

As described above, in the wireless power transmission of the present embodiment, power feeding coil device 21 comprises a plurality of coil devices which do not overlap with each other when viewing from an opposite direction of two magnetic bodies 17. In the power feeding region away from the position where power feeding coil device 21 is disposed, the amount of the magnetic flux released from the surface of magnetic body 17 reduces. Therefore, when a plurality of power feeding coil devices 21 are disposed so that they do not overlap with each other when viewing from a direction in which two magnetic bodies 17 face each other, the range of the power feeding region can be enlarged in which the magnetic flux with a certain fixed amount or more is released from the surface of magnetic body 17.

The Ninth Embodiment

Next, the structure of the wireless power transmission device according to the ninth embodiment of the present invention is described. The construction of the wireless power transmission device of the ninth embodiment is the same as that of the wireless power transmission device of the eighth embodiment. In the wireless power transmission device according to the ninth embodiment, power supply device 30 is constructed by being capable of selecting coil devices 22a and 22b for supplying power.

Figure 19A:
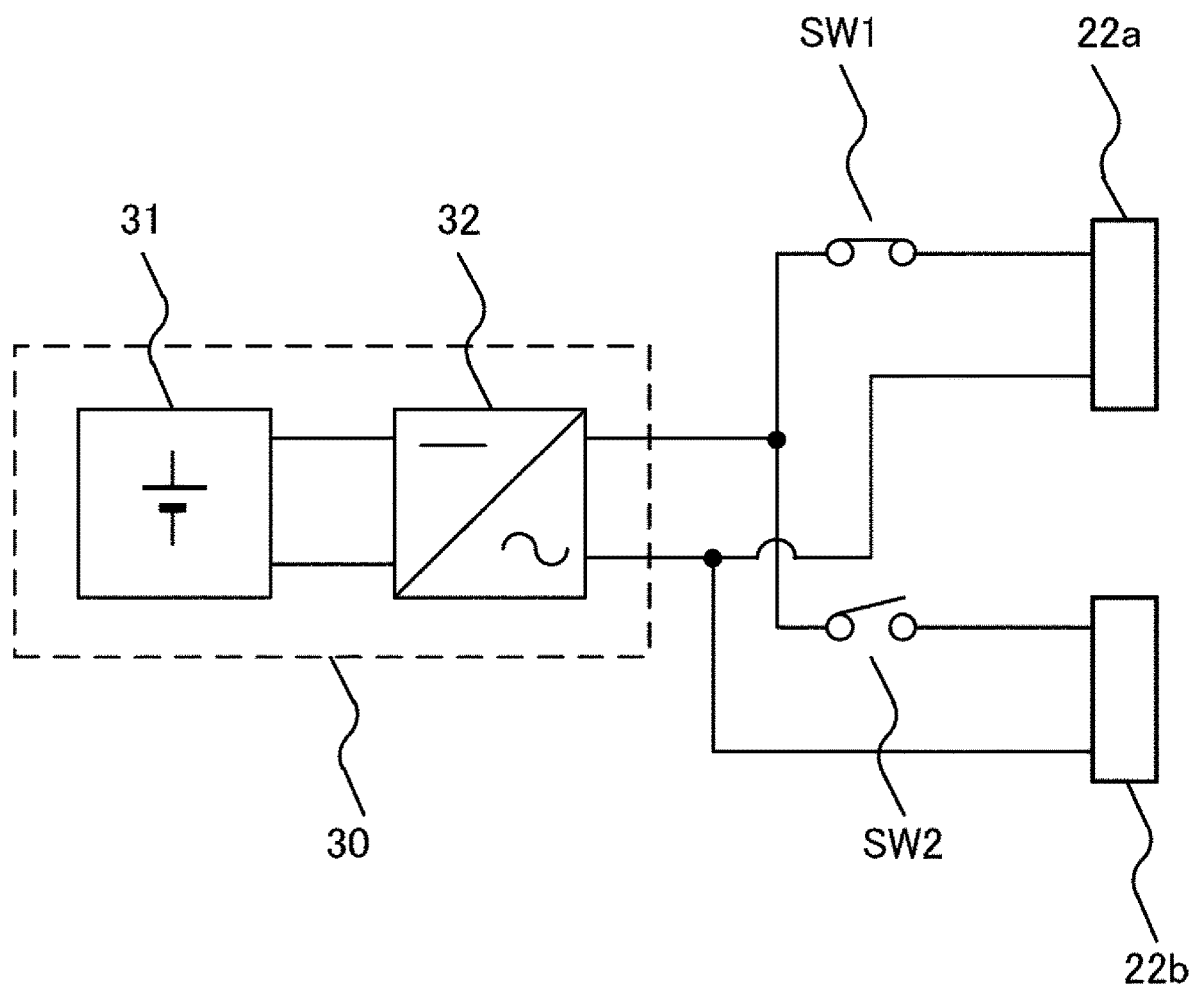
FIG. 19a is a schematic functional block diagram illustrating an example in which a switch is disposed between the power supply device and the power feeding coil device.
Figure 19B:
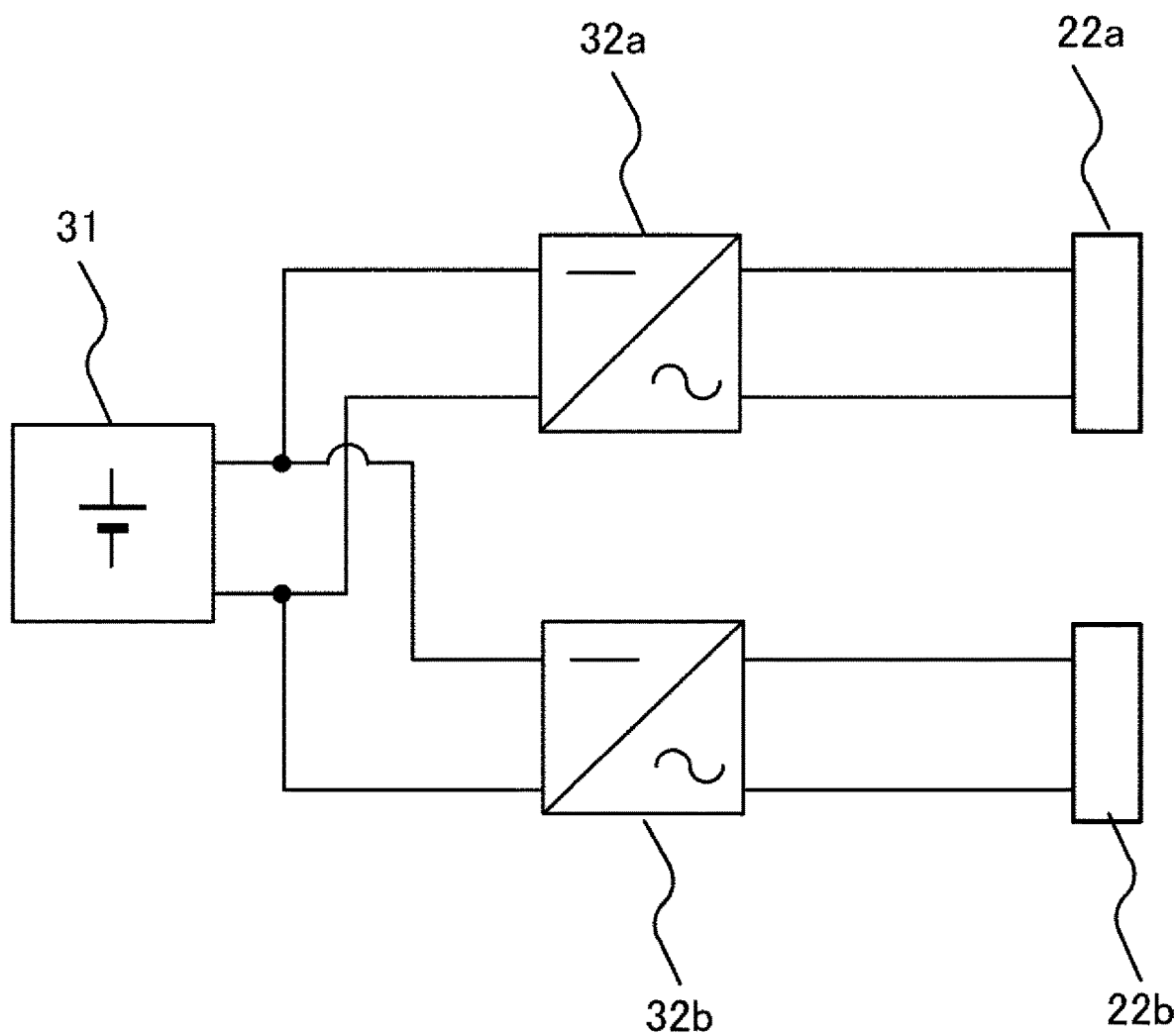
FIG. 19b is a schematic functional block diagram illustrating an example in which a plurality of power conversion circuits of the power supply device are disposed.

As mentioned above, in the present embodiment, power supply device 30 is constructed by being capable of selecting coil devices 22a and 22b for supplying power. Herein, the construction in which power supply device 30 is constructed by being capable of selecting coil devices 22a and 22b for supplying power is described with reference FIG. 19a and FIG. 19b. FIG. 19a is a schematic functional block diagram illustrating an example in which a switch is disposed between the power supply device and the power feeding coil device. FIG. 19b is a schematic functional block diagram illustrating an example in which a plurality of power conversion circuits of the power supply device are disposed. For example, switch SW for switching connection between power conversion circuit 32 of power supply device 30 and two coil devices 22a, 22b is disposed, and is constructed so as to select coil devices 22a, 22b for supplying power by power supply device 30. To be specific, as shown in FIG. 19a, one end of the output of power conversion circuit 32 is connected to one end of coil device 22a through switch SW1, and is connected to one end of coil device 22b through switch SW2, and the other end of the output of power conversion circuit 32 is connected to the other end of coil device 22a and the other end of coil device 22b. That is, when power supply device 30 chooses coil device 22a to supply power, switch SW1 is controlled to be ON and switch SW2 is controlled to be OFF so as to connect power conversion circuit 32 to the power feeding coil of coil device 22a. When power supply device 30 chooses coil device 22b to supply power, switch SW1 is controlled to be OFF and switch SW2 is controlled to be ON so as to connect power conversion circuit 32 to the power feeding coil of coil device 22b. Alternatively, as shown in FIG. 19b, power supply device 30 comprises power conversion circuit 32a connected to coil device 22a and power conversion circuit 32b connected to coil device 22b. Power supply device 30 is constructed so as to select coil devices 22a and 22b for supplying electric power by controlling to operate these power conversion circuits 32a and 32b. That is, when power supply device 30 chooses coil device 22a to supply electric power, power conversion circuit 32a is controlled to work and power conversion circuit 32b is controlled to stop working. When power supply device 30 chooses coil device 22b to supply electric power, power conversion circuit 32b is controlled to work and power conversion circuit 32a is controlled to stop working. Power supply device 30 with such construction can select coil devices 22a and 22b for supply electric power among a plurality of coil devices according to the region to be power feeded. To be specific, power supply device 30 selects coil devices 22a and 22b for supply electric power according to the distance between power receiving coil device 40 (which is disposed between two magnetic bodies 17) and two coil devices 22a, 22b. More specifically, power supply device 30 selects the coil device disposed the position close to power receiving coil device 40 among a plurality of coil devices to supply electric power. For example, coil device 22b is disposed to be closer to power receiving coil device 40 than coil device 22a in the example shown in the above FIG. 18, so power supply device 30 will choose coil device 22b to supply electric power. Thus, power receiving coil device 40 can receive a certain fixed amount or more of power even if power is only feeded from the coil device disposed at the position close to power receiving coil device 40. Therefore, power can be efficiently transmitted by stopping power feeding from the coil device disposed at the position away from coil receiving coil device 40. In addition, the case that power feeding coil device 21 is constructed by two coil devices 22a and 22b has been described in the present embodiment, and the case that power feeding coil device 21 is constructed by three or more coil device is the same.

As described above, the wireless power transmission device of the present embodiment further comprises power supply device 30 for supply power to power feeding coil device 21, and power supply device 30 chooses coil devices 22a and 22b for supply power based on the region to be power feeded among the plurality of coil devices. Thus, the wasteful electricity consumption can be cut down by selecting power feeding coil device 21 for supplying power among the plurality of coil devices according to the region to be power feeded.

The Tenth Embodiment

Figure 20:
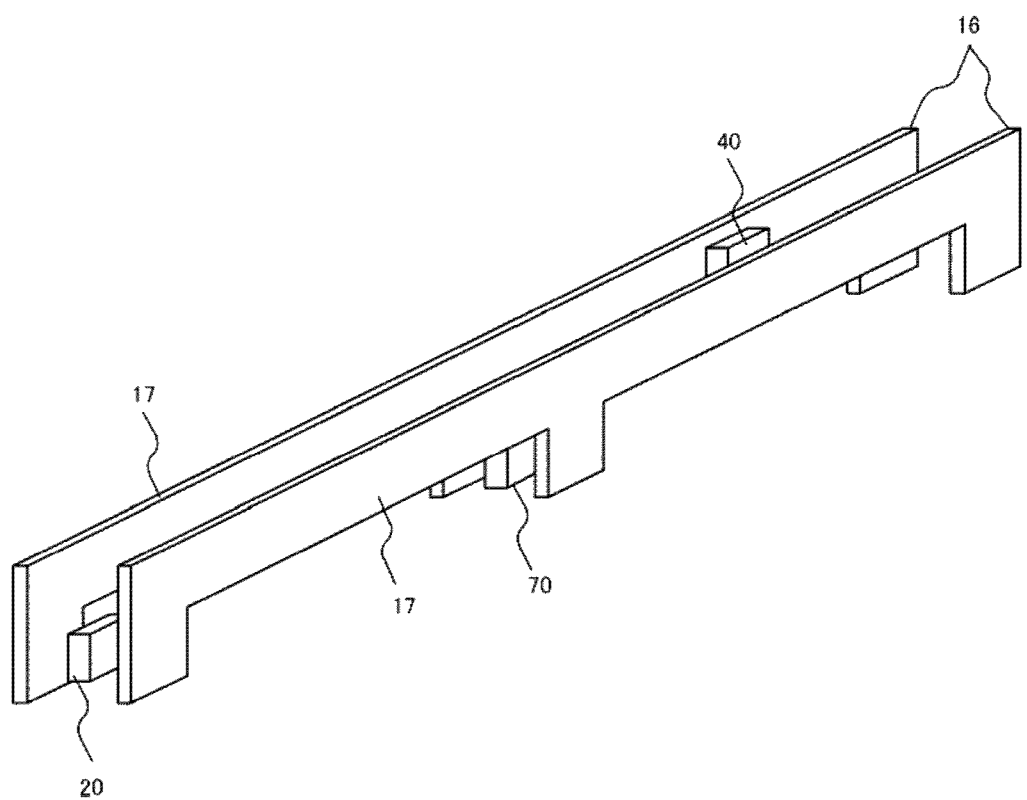
FIG. 20 is a schematic perspective view illustrating the power feeding device of the wireless power transmission device together with the power receiving device of the tenth embodiment of the present invention.

Next, the structure of the wireless power transmission device according to the tenth embodiment of the present invention is described with reference to FIG. 20. FIG. 20 is a schematic perspective view illustrating the power feeding device of the wireless power transmission device together with the power receiving device of the tenth embodiment of the present invention. In addition, the power supply device is omitted in FIG. 20 for convenience of illustration.

The wireless power transmission device of the tenth embodiment comprises power feeding device S2 and power receiving device S3, which is the same as wireless power transmission device S1 according to the first embodiment. Power feeding device S2 includes magnetic structure 16, power feeding coil device 20, power supply device 30, and relay coil device 70. Power receiving device S3 includes power receiving coil device 40 and output circuit portion 50. The constructions of power feeding coil device 20, power supply device 30, power receiving coil device 40 and output circuit portion 50 are the same as those in wireless power transmission device S1 according to the first embodiment, and the construction of magnetic structure 16 is the same as that in the wireless power transmission device according to the eighth embodiment. The power feeding device according to the present embodiment is different from those of the first embodiment and the eighth embodiment in the point that power feeding device S2 comprises relay coil device 70.

Relay coil device 70 preferably includes a relay coil constructed by winding the conducting wire and comprises a housing with insulation for housing the relay coil. As the relay coil, it can be a coil with a helical structure obtained by winding conducting wires to be a planar shape, and also can be a coil with a solenoid structure obtained by helically winding conducting wires, which is the same as the power feeding coil of power feeding coil device 20. When the relay coil is the coil with the solenoid structure, the relay coil preferably includes a magnetic core, which is the same as the power feeding coil shown in FIG. 7a and FIG. 7b. When the relay coil with the same inductance value is prepared, the winding number of the relay coil can be decreased if it includes the magnetic core. Thus, the resistance value of the relay coil also can be decreased, and the power loss caused by the resistance can be decreased. In addition, relay coil device 70 is constructed by various circuit elements comprising the coil. To be specific, relay coil device 70 can be constructed only by the coil. If the function of relay coil device 70 is considered, a capacitor is preferably comprised to form a resonance circuit with the coil, and the capacitor is connected in series or in parallel with the coil. The relay coil device 70 is disposed at any position between two magnetic bodies 17. In the present embodiment, relay coil device 70 is disposed between the main surfaces facing each other of the projecting portion extending from the lower part of the central of the linear portion in two magnetic bodies 17. Power feeding coil device 20 is disposed between the main surfaces facing each other of the projecting portion extending from the lower part of one end of the linear portion in two magnetic bodies 17. In this way, although relay coil device 70 is not electrically connected to power supply device 30, i.e., power supply source, a voltage is generated in the relay coil of relay coil device 70 if the magnetic flux generated by power feeding coil device 20 is interlinked. Thus, a current based on the above voltage flows into the relay coil to generate the magnetic flux. That is, relay coil device 70 is magnetically coupled with the power feeding coil of power feeding coil device 20 through the two magnetic bodies 17. Specifically, during transmitting power, the magnetic flux (which is generated from power feeding coil device 20 and flows to one of the two magnetic bodies 17) passes through magnetic body 17 from one end part of the linear portion towards the central part in magnetic body 17, is radiated from the surface of magnetic body 17 to air, and then is interlinked with the relay coil of relay coil device 70. Then, a voltage is generated in the relay coil of relay coil device 70, and thus a current based on the voltage flows to the relay coil to generate the magnetic flux. In addition, the magnetic flux (which is generated from relay coil device 70 and then flows into one of the two magnetic bodies 17) passes through magnetic body 17 from the central part of the linear portion towards the other end part in magnetic body 17, and then is radiated from the surface of magnetic body 17 to air. That is, because relay coil device 70 generates magnetic flux which spreads to a distance after receiving the magnetic flux generated by power feeding coil device 20, relay coil device 70 functions as a relay portion for wirelessly transmitting power between power feeding coil device 20 and power receiving coil device 40.

However, if power receiving coil device 40 is disposed at the position far away from power feeding coil device 20, the amount of the magnetic flux interlinked with power receiving coil device 40 among the magnetic flux generated from power feeding coil device 20 reduces. That is, power which can be received by power receiving coil device 40 becomes small. In the present embodiment, relay coil device 70 magnetically coupled with power feeding coil device 20 through the two magnetic bodies 17 is further comprised. So, relay coil device 70 can receive the magnetic flux generated from power feeding coil device 20 and generates the magnetic flux which spreads to a more distance. The magnetic flux with a certain fixed amount or more is interlinked with power receiving coil device 40, and thus power with a certain fixed amount or more can be received. In other words, the decrease of power which can be received by power receiving coil device 40 can be suppressed by relay coil device 70.

As described above, the wireless power transmission device of the present embodiment comprises relay coil device 70 magnetically coupled with power feeding coil device 20 through the two magnetic bodies 17, and relay coil device 70 is disposed at any position between the two magnetic bodies 17. In the power feeding region far away from power feeding coil device 20, the amount of the magnetic flux released from the surface of magnetic bodies 17 reduces. If relay coil device 70 is disposed, the magnetic flux released from the surface of magnetic bodies 17 is interlinked with relay coil device 70, and then the magnetic flux has a change. Thus, a voltage is generated in the coil of relay coil device 70. In this way, a current flows in relay coil device 70 by the generated voltage, and thus the magnetic flux is generated by relay coil device 70. Therefore, by disposing relay coil device 70, the decrease amount of the magnetic flux released from the surface of magnetic bodies 17 can be reduced even in the power feeding region far away from power feeding coil device 20.

The Eleventh Embodiment

Figure 21:
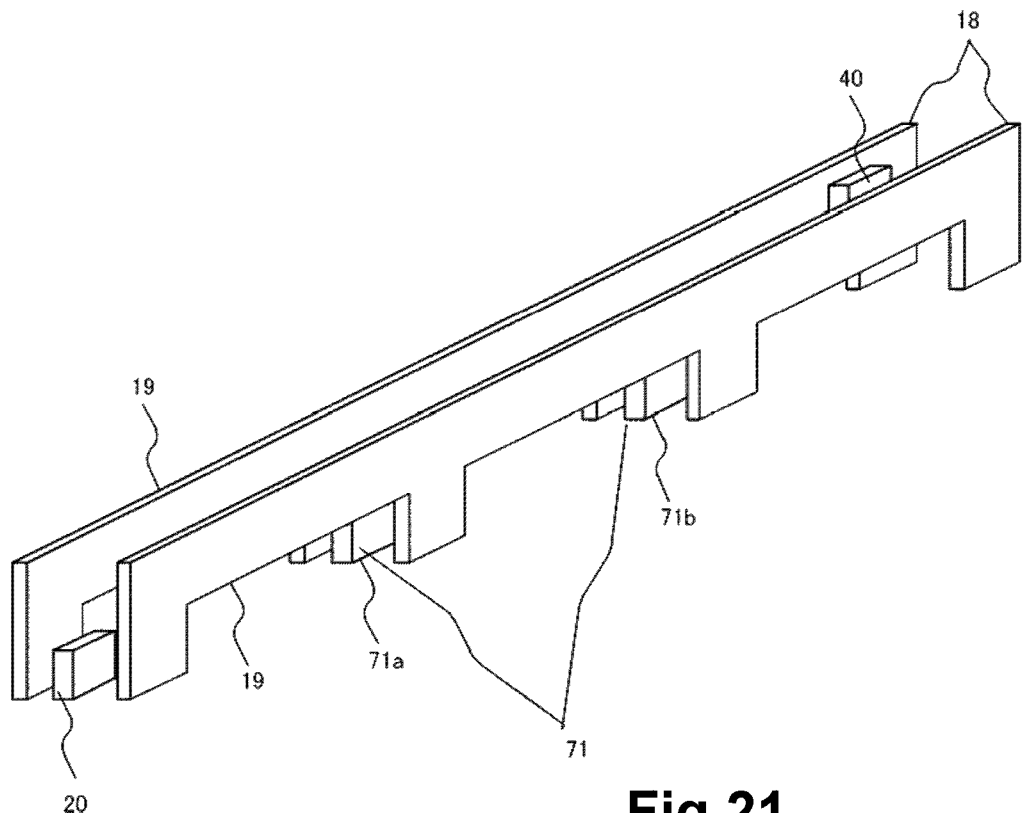
FIG. 21 is a schematic perspective view illustrating the power feeding device of the wireless power transmission device together with the power receiving device of the eleventh embodiment of the present invention.

Next, the structure of the wireless power transmission device according to the eleventh embodiment of the present invention is described with reference to FIG. 21. FIG. 21 is a schematic perspective view illustrating the power feeding device of the wireless power transmission device together with the power receiving device according to the eleventh embodiment of the present invention. In addition, the power supply device is omitted in FIG. 21 for convenience of illustration.

The wireless power transmission device of the eleventh embodiment comprises power feeding device S2 and power receiving device S3, which are the same as wireless power transmission device S1 according to the tenth embodiment. Power feeding device S2 includes magnetic structure 18, power feeding coil device 20, power supply device 30, and relay coil device 71. Power receiving device S3 includes power receiving coil device 40 and output circuit portion 50. The constructions of power feeding coil device 20, power supply device 30, power receiving coil device 40 and output circuit portion 50 are the same as those in wireless power transmission device S1 according to the tenth embodiment. The present embodiment is different from the tenth embodiment in the point that magnetic structure 18 is comprised to replace magnetic structure 16 and relay coil device 71 comprises a plurality of coil devices 71*a* and 71*b*.

Magnetic structure 18 has two tabular magnetic bodies 19. The two magnetic bodies 19 respectively exhibit approximately comb-toothed shape which has a linear portion (linearly extending along the horizontal direction) and a projecting portion (extending along the vertical direction from lower part of the central close to one end part, lower part of the central close to the other end part and the lower parts of the two ends of the linear portion). That is, in the present embodiment, the main surfaces of two magnetic bodies 19 exhibit approximately comb-toothed shape. The two magnetic bodies 19 whose mutual main surfaces face each other are disposed to be separated at a predetermined distance. In the present embodiment, the mutual main surfaces of the two magnetic bodies 19 are approximately parallel to each other. That is, the two magnetic bodies 19 are disposed with a constant distance between the two magnetic bodies. In addition, the two magnetic bodies 19 in the present embodiment exhibit approximately comb-toothed shape, but they are not limited thereto, and the two magnetic bodies can be properly set to be any shape based on the shape or the conformation of power receiving device S3 to which power is transmitted by power feeding device S2. In addition, the distance between the two magnetic bodies 19 can be properly set based on the shape or the conformation of power receiving device S3 to which power is transmitted by power feeding device S2 as well as the electric energy which is supplied to power receiving device S3. Further, the two magnetic bodies 19 can be disposed so that the opposite direction of the mutual main surfaces of the two magnetic bodies 19 is horizontal, and they also can be disposed so that the opposite direction is vertical. As the two magnetic bodies 19 constituted as above, they can be listed as the magnetic materials such as ferrite, permalloy, silicon steel plate, or the like. Moreover, the material with a higher relative permeability is more preferable, and the magnetic material with a relative permeability of 1000 or more is more preferably used.

Relay coil device 71 comprises a plurality of coil devices. In the present embodiment, it is constructed by two coil devices 71*a* and 71*b*. Each of coil devices 71*a*, 71*b* preferably includes a relay coil constructed by winding the conducting wire and comprises a housing with insulation for housing the relay coil, which is the same as relay coil device 70. As the relay coil, it can be a coil with a helical structure obtained by winding conducting wires to be a planar shape, and also can be a coil with a solenoid structure obtained by helically winding conducting wires, which is the same as the power feeding coil of power feeding coil device 20. When the relay coil is the coil with the solenoid structure, the relay coil may include a magnetic core. In addition, each of coil devices 71*a*, 71*b* can be constructed by various circuit elements comprising the coil, and can be constructed only by the coil. A capacitor may be comprised to form a resonance circuit with the coil, and the capacitor is connected in series or in parallel with the coil. These coil device 71*a* and 71*b* are disposed at any position between the two magnetic bodies 19. In the present embodiment, power feeding coil device 20 is disposed between the main surfaces facing each other of the projecting portion extending from the lower part of one end of the linear portion of the two magnetic bodies 19, coil device 71*a* is disposed between the main surfaces facing each other of the projecting portion extending from the lower part of the central close to one end of the linear portion of the two magnetic bodies 19, and coil device 71*b* is disposed between the main surfaces facing each other of the projecting portion extending from the lower part of the central close to the other end of the linear portion of the two magnetic bodies 19. In this way, during transmitting power, the magnetic flux (which is generated from power feeding coil device 20 and flows to one of the two magnetic bodies 19) passes through magnetic body 19 from one end part of the linear portion of magnetic body 19 towards the central part close to one end, is radiated from the surface of magnetic body 19 to the air, and then is interlinked with the relay coil of coil device 71*a*. Then, a voltage is generated in the relay coil of coil device 71*a*, and thus a current based on the voltage flows to the relay coil to generate the magnetic flux. Subsequently, the magnetic flux (which is generated from coil device 71a and flows to one of the two magnetic bodies 19) passes through magnetic body 19 from the central part close to one end of the linear portion of magnetic body 19 towards the central part close to the other end, is radiated from the surface of magnetic body 19 to air, and then is interlinked with the relay coil of coil device 71b. Then, a voltage is generated in the relay coil of coil device 71b, and thus a current based on the voltage flows to the relay coil to generate the magnetic flux. Subsequently, the magnetic flux (which is generated from coil device 71b and flows to one of the two magnetic bodies 19) further passes through magnetic body 19 from the central part close to the other end of the linear portion of the magnetic body 19 towards the other end, and then is radiated from the surface of magnetic body 19 to air. That is, in the present embodiment, the magnetic flux generated from power feeding coil device 20 is relayed by coil device 71a, further relayed from coil device 71a to coil device 71b, and then is interlinked with power receiving coil device 40. Therefore, power which can be received by power receiving coil device 40 can be prevent from reducing even if power receiving coil device 40 is disposed at the position far away from power feeding coil device 20. Moreover, the example in which relay coil device 71 comprises two coil devices 71a and 71b has been described in the present embodiment, but the number of the coil devices comprised in relay coil device 71 can be set as three or more.

As described above, the wireless power transmission device of the present embodiment comprises a plurality of relay coil devices 71, and the relay coil devices 71 are magnetically coupled with power feeding coil device 20 through the two magnetic bodies 19 and disposed at any position between the two magnetic bodies 19. The amount of the magnetic flux released from the surface of magnetic body 19 reduces in the power feeding region far away from power feeding coil device 20. If relay coil device 71 is disposed, the magnetic flux released from the surface of magnetic bodies 19 is interlinked with relay coil device 71, and then the magnetic flux has a change. Thus, a voltage is generated in the coil of relay coil device 71. In this way, a current flows in relay coil device 71 by the generated voltage, and thus the magnetic flux is generated by relay coil device 71. Therefore, by disposing relay coil device 71, the decrease amount of the magnetic flux released from the surface of magnetic bodies 19 can be reduced even in the power feeding region far away from power feeding coil device 20.

The Twelfth Embodiment

Figure 22:
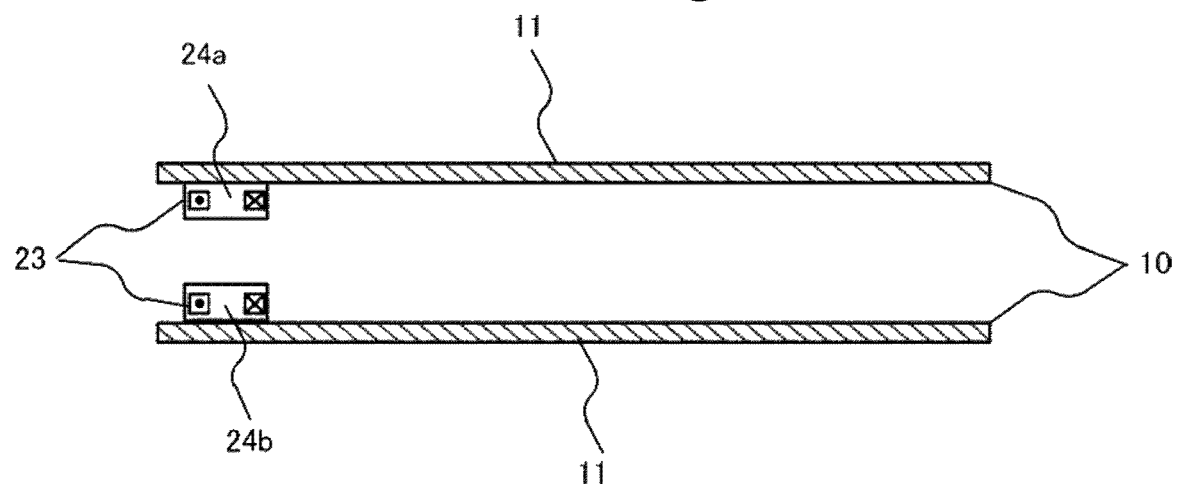
FIG. 22 is a cross-sectional view illustrating the power feeding device of the wireless power transmission device of the twelfth embodiment of the present invention, which corresponds to the cross-sectional view of the power feeding device of the wireless power transmission device of the first embodiment of the present invention as shown in FIG. 3.

Next, the structure of the wireless power transmission device according to the twelfth embodiment of the present invention is described with reference to FIG. 22. FIG. 22 is a cross-sectional view illustrating the power feeding device of the wireless power transmission device of the twelfth embodiment of the present invention, which corresponds to the cross-sectional view of the power feeding device of the wireless power transmission device of the first embodiment of the present invention as shown in FIG. 3. In addition, the power supply device is omitted in FIG. 22 for convenience of illustration.

The wireless power transmission device of the twelfth embodiment comprises power feeding device S2 and power receiving device S3, which is the same as wireless power transmission device S1 according to the first embodiment. Power feeding device S2 includes magnetic structure 10, power feeding coil device 23, and power supply device 30. Power receiving device S3 includes power receiving coil device 40 and output circuit portion 50. The constructions of power feeding coil device 20, power supply device 30, power receiving coil device 40 and output circuit portion 50 are the same as those in the wireless power transmission device according to the first embodiment. The present embodiment is different from the first embodiment in the point that power feeding coil device 23 is comprised to replace power feeding coil device 20, power conversion circuit 32 of power supply device 30 is capable of controlling phase of alternating voltage applied to power feeding coil device 23.

Power feeding coil device 23 is connected to power conversion circuit 32, and functions as a power feeding portion which wirelessly transmits AC power supplied from power conversion circuit 32 to power receiving coil device 40. Power feeding coil device 32 comprises a plurality of coil devices. In the present embodiment, power feeding coil device 23 is constructed by two coil devices 24a and 24b. Each of coil devices 24a and 24b includes a power feeding coil constructed by winding conducting wires, and a housing with insulation for housing the power feeding coil, which are the same as power feeding coil device 20. If an alternating voltage is applied from power conversion circuit 32 to the power feeding coil, an alternating current flows to generate an alternating magnetic field. The power feeding coil can be a coil with a helical structure obtained by winding a conducting wire to be a planar shape, and also can be a coil with a solenoid structure obtained by helically winding a conducting wire. In the case that the power feeding coil is the coil with a solenoid structure, the power feeding coil can have a magnetic core. As the conducting wire, it can be listed as the metal wire such as copper, silver, gold, aluminum, or the like. The conducting wire can comprise a unifilar metal wire, and also can comprise a litz wire obtained by twisting a plurality of metal wires together. In addition, the winding number of the conducting wire of the power feeding coil can be properly set based on the desired power transmission efficiency or the like. Moreover, each of coil devices 24a and 24b can be constructed by various circuit elements comprising a coil and also can be constructed only by a coil, which is the same as power feeding coil device 20. The coil device can comprise a capacitor (which is connected in series or in parallel with the coil) to form a resonance circuit together with the coil. Alternatively, the coil device also can comprise an inductor or a noise filter except the coil.

In the present embodiment, each of two coil devices 24a and 24b is disposed so as to overlap with each other when viewing from an opposite direction of two magnetic bodies 11. To be specific, each of coil devices 24a and 24b is disposed so that the axial direction of the coil axis of each power feeding coil is approximately parallel to the opposite direction of the mutual main surfaces of two magnetic bodies 11. Besides, each of coil devices 24a and 24b is disposed so that the axial direction of the coil axis of the power feeding coil of coil device 24a is in line with that of the coil device 24b. In this way, as power feeding coil device 23 comprises two coil devices 24a and 24b, power which can be supplied can be increased. In addition, coil device 24a is disposed so that it contacts with one of two magnetic bodies 11 through an insulating material, and coil device 24b is disposed so that it contacts with the other magnetic body 11 through an insulating material. More specifically, coil device 24a is disposed so that one end surface in the axial direction of the power feeding coil of coil device 24a is in contact with first main surface 11a of one of two magnetic bodies 11 through an insulating material, and coil device 24b is disposed so that one end surface in the axial direction of the power feeding coil of coil device 24b is in contact with first main surface 11a of the other magnetic body 11 through an insulating material. With respect to the insulating material present between each of coil devices 24a, 24b and magnetic bodies 11, a housing with insulation for housing the power feeding coil of power feeding coil devices 24a and 24b can be used as the insulating material, and an insulating resin separately disposed between each of power feeding coil devices 24a, 24b and magnetic bodies 11 also can be used as the insulating material. In addition, when the power feeding coil of each of coil devices 24a and 24b is directly disposed on magnetic bodies 11, the conducting wire constituting the power feeding coil can be made of an insulating coating conductor, and the insulating coating can be used as the insulating material. Thus, as coil device 24a is disposed so that it contacts with one of two magnetic bodies 11 through the insulating material and coil device 24b is disposed so that it contacts with the other magnetic body 11 through the insulating material, the distances between the power feeding coils of each of coil devices 24a, 24b and magnetic bodies 11 do not change. Thus, the inductance value of each power feeding coil can not change. That is, the deviation of the inductance value of each power feeding coil cased by the disposition of coil devices 24a and 24b can be suppressed to be low. In addition, when each of coil devices 24a and 24b comprises an capacitor for forming a resonance circuit together with each power feeding coil, if the deviation of the inductance value of the power feeding coil is suppressed to be low as shown in the present embodiment, the deviation of the resonance frequency of the resonance circuit formed by the power feeding coil and the capacitor also can be suppressed to be low.

In addition, in the present embodiment, power conversion circuit 32 of power supply device 30 is constructed to be capable of controlling phase of alternating voltage applied to each of coil devices 24a and 24b of power feeding coil device 23. If the alternating voltage is applied from power conversion circuit 32 of power supply device 30 to each of coil devices 24a and 24b, an alternating current based on the alternating voltage flows to generate an alternating magnetic field, and thus magnetic flux is generated. Herein, if the alternating current having the same phase flows in each coil devices 24a and 24b, the magnetic flux generated from each of coil device 24a, 24b is added, and thus power which can be supplied will becomes larger. On the other hand, if the alternating current having the antiphase in which the phase differs with 180° flows in coil devices 24a and 24b, the magnetic flux generated from each of coil devices 24a and 24b is counteractanted mutually, and thus power which can be supplied will becomes lower. Therefore, power which can be supplied can be controlled by making the phase of the alternating current flowing in each of coil devices 24a and 24b change. In the present embodiment, power conversion circuit 32 of power supply device 30 is constructed so as to be able to control the phase shift amount between the phase of the alternating voltage applied to coil device 24a and the phase of the alternating voltage applied to coil device 24b. To be specific, it can be realized when power supply device 30 comprises power conversion circuit 32 connected with coil device 24a and power conversion circuit 32 connected with coil device 24b. That is, by controlling the phase shift amount between the phase of the alternating voltage applied by power conversion circuit 32 connected with coil device 24a and the phase of the alternating voltage applied by power conversion circuit 32 connected with coil device 24b, the phase of the alternating current flowed into each of coil devices 24a and 24b will change. In addition, the phase shift amount between the phase of the alternating voltage applied to coil device 24a and the phase of the alternating voltage applied to coil device 24b can be properly adjusted based on the amount of power required by power receiving device S3.

As described above, in the wireless power transmission device of the present embodiment, power feeding coil device 23 comprises two coil devices 24a and 24b which overlap with each other when viewing from an opposite direction of two magnetic bodies 11, one of two coil devices 24a and 24b is disposed so as to contact with one of two magnetic bodies 11 through an insulating material, and the other of two coil devices 24a and 24b is disposed so as to contact with the other of two magnetic body 11 through an insulating material. Therefore, the deviation of the inductance value caused by the disposition of power feeding coil device 23 can be decreased. If the deviation of the inductance value is suppressed to be low, the deviation of the generated magnetic flux also can be suppressed to be low. Thus, a stable power can be transmitted.

In addition, in the wireless power transmission device of the present embodiment, power supply device 30 for supplying power to power feeding coil device 23 is further comprised. Power supply device 30 controls the phase shift amount between the phase of the alternating voltage applied to one of two coil devices 24a and 24b and the phase of the alternating voltage applied to the other of two coil devices 24a and 24b. Thus, power which can be received in the power feeding region can be controlled according to the phase shift amount.

DESCRIPTION OF REFERENCE NUMERALS 10, 14, 16, 18 . . . magnetic structure; 11, 15, 17, 19 . . . magnetic body; 11a . . . first main surface; 11b . . . second main surface; 12 . . . magnetic plate; 13 . . . magnetic core; 20, 21, 23 . . . power feeding coil device; 30 . . . power supply device; 31 . . . power supply; 32, 32a, 32b . . . power conversion circuit; 40 . . . power receiving coil device; output circuit portion; 51 . . . rectifier circuit; 52 . . . load; 60 . . . electromagnetic shielding material; 70, 71 . . . relay coil device; 80 . . . conducting wire; 90 . . . bobbin; L1 . . . coil; L2 . . . inductor; N . . . noise filter; S1 . . . wireless power transmission device; S2 . . . power feeding device; S3 . . . power receiving device.

What is claimed is:

1. A power feeding device for wirelessly transmitting power to a power receiving device equipped with a power receiving coil device, comprising:
a magnetic structure having two magnetic bodies, mutual main surfaces of the two magnetic bodies facing each other, the two magnetic bodies being separated at a predetermined distance; and
a power feeding coil device which receives power from a power supply and generates an alternating magnetic field, the power feeding coil device being disposed at a position between the two magnetic bodies, an axial direction of the coil axis of a power feeding coil in the power feeding coil device intersecting the main surfaces of the two magnetic bodies,
wherein the two magnetic bodies receive the alternating magnetic field during power transmission, and a power feeding region in which transmitting power to the power receiving coil device is possible is formed between the two magnetic bodies.

2. The power feeding device according to claim 1, wherein
the two magnetic bodies comprise a plurality of magnetic plates, respectively.

3. The power feeding device according to claim 1, wherein
an electromagnetic shielding material is comprised on at least either of the surface sides opposite to the side where the mutual main surfaces of the two magnetic bodies face each other.

4. The power feeding device according to claim 1, wherein
the power feeding coil device is disposed in such a manner that the power feeding coil device contacts with at least either of the two magnetic bodies through an insulating material.

5. The power feeding device according to claim 1, wherein
the power feeding coil device is configured in such a manner that the power feeding coil device can move between the two magnetic bodies.

6. The power feeding device according to claim 1, wherein
the two magnetic bodies are disposed in such a manner that the distance between the two magnetic bodies becomes short as leaving from the position where the power feeding coil device is disposed.

7. The power feeding device according to claim 5, wherein
the two magnetic bodies are disposed in such a manner that the distance between the two magnetic bodies becomes long towards the destination to which the power feeding coil device moves.

8. The power feeding device according to claim 1, wherein
the power feeding coil device comprises a plurality of coil devices which do not overlap with each other when viewing from an opposite direction of the two magnetic bodies.

9. The power feeding device according to claim 8, further comprising:
a power supply device for supplying power to the power feeding coil device,
wherein the power supply device selects the coil device for supplying power among the plurality of coil devices according to the region to be power fed.

10. The power feeding device according to claim 1, wherein
the power feeding coil device comprises a power feeding coil which is constructed by helically winding a conducting wire on a magnetic core.

11. The power feeding device according to claim 1, further comprising:
at least one relay coil device which is magnetically coupled with the power feeding coil device through the two magnetic bodies and is disposed at any position between the two magnetic bodies.

12. The power feeding device according to claim 11, wherein
the relay coil device comprises a relay coil which is constructed by helically winding a conducting wire on a magnetic core.

13. The power feeding device according to claim 1, wherein
the power feeding coil device comprises two coil devices which overlap with each other when viewing from an opposite direction of the two magnetic bodies,
one of the two coil devices is disposed to contact with one of the two magnetic bodies through an insulating material,
the other of the two coil devices is disposed to contact with the other of the two magnetic bodies through an insulating material.

14. The power feeding device according to claim 13, further comprising:
a power supply device for supplying power to the power feeding coil device,
wherein the power supply device controls a phase shift amount between a phase of an alternating voltage applied to one of the two coil devices and a phase of an alternating voltage applied to the other of the two coil devices.

15. A wireless power transmission device, comprising:
the power feeding device according to claim 1; and
a power receiving device equipped with a power receiving coil device.

* * * * *